(12) United States Patent
Kondo et al.

(10) Patent No.: US 9,468,921 B2
(45) Date of Patent: Oct. 18, 2016

(54) HONEYCOMB STRUCTURE

(71) Applicant: NGK INSULATORS, LTD., Nagoya (JP)

(72) Inventors: Yoshimasa Kondo, Nagoya (JP); Tsuyoshi Watanabe, Nagoya (JP); Yusuke Hosoi, Nagoya (JP); Atsushi Kaneda, Nagoya (JP); Kazumi Nagareda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 553 days.

(21) Appl. No.: 13/912,238

(22) Filed: Jun. 7, 2013

(65) Prior Publication Data
US 2013/0270258 A1    Oct. 17, 2013

Related U.S. Application Data

(63) Continuation of application No. PCT/JP2011/079940, filed on Dec. 22, 2011.

(30) Foreign Application Priority Data

Dec. 24, 2010   (JP) ................................ 2010-288673

(51) Int. Cl.
  *H05B 3/10*   (2006.01)
  *B01J 35/04*  (2006.01)
  (Continued)

(52) U.S. Cl.
  CPC ............ B01J 35/04 (2013.01); B01D 46/2429 (2013.01); F01N 3/2026 (2013.01);
  (Continued)

(58) Field of Classification Search
  CPC .............. B01D 2046/2433; B01D 2255/9155; B01D 46/2448; B01D 53/94; B01J 35/04; F01N 2240/16; F01N 2260/10; F01N 2330/30; F01N 3/2026; F01N 3/2828; H05B 3/42; Y02T 10/26; Y10T 428/24149

USPC .......... 219/553, 205; 428/116, 593; 60/300; 422/173

See application file for complete search history.

(56) References Cited

U.S. PATENT DOCUMENTS 5,063,029 A    11/1991  Mizuno et al.
5,266,278 A *  11/1993  Harada ................. F01N 3/2026
                                                  219/541

(Continued)

FOREIGN PATENT DOCUMENTS

CN    1115966 A    1/1996
CN    1156494 A    8/1997

(Continued)

OTHER PUBLICATIONS

International Search Report and Written Opinion dated Feb. 7, 2012.
(Continued)

*Primary Examiner* — Dana Ross
*Assistant Examiner* — Joseph Iskra
(74) *Attorney, Agent, or Firm* — Burr & Brown, PLLC

(57) ABSTRACT

A honeycomb structure including a tubular honeycomb structure portion having: porous partition walls with which a plurality of cells extending from one end surface to the other end surface are formed to partition through channels of a fluid; and an outer peripheral wall positioned on an outermost periphery, an electrical resistivity of the partition walls is from 1 to 200 Ωcm, at least a part of the outer peripheral wall is formed by a low Young's modulus portion configured to have a Young's modulus lower than that of the partition walls, and a ratio of the Young's modulus of the low Young's modulus portion to the Young's modulus of the partition walls is from 2 to 95%. Provided is a honeycomb structure which is a catalyst carrier and also functions as a heater when a voltage is applied thereto and which has an excellent heat shock resistance.

14 Claims, 17 Drawing Sheets

(51) Int. Cl.
*F01N 3/20* (2006.01)
*F01N 3/28* (2006.01)
*H05B 3/42* (2006.01)
*B01D 46/24* (2006.01)
*B01D 53/94* (2006.01)

(52) U.S. Cl.
CPC ............ *F01N 3/2828* (2013.01); *H05B 3/42* (2013.01); *B01D 46/2448* (2013.01); *B01D 53/94* (2013.01); *B01D 2046/2433* (2013.01); *B01D 2255/9155* (2013.01); *F01N 2240/16* (2013.01); *F01N 2260/10* (2013.01); *F01N 2330/30* (2013.01); *H05B 2203/024* (2013.01); *Y02T 10/26* (2013.01); *Y10T 428/24149* (2015.01)

(56) References Cited

U.S. PATENT DOCUMENTS

| | | | |
|---|---|---|---|
| 5,288,975 A | 2/1994 | Kondo | |
| 5,866,230 A | 2/1999 | Maus | |
| 5,887,426 A | 3/1999 | Brück | |
| 2002/0197193 A1* | 12/2002 | Harada | B01D 53/885 422/177 |
| 2003/0134084 A1 | 7/2003 | Ichikawa et al. | |
| 2004/0244344 A1* | 12/2004 | Ichikawa | B01D 39/2068 55/523 |
| 2007/0231536 A1* | 10/2007 | Shionoya | B01D 46/2455 428/116 |
| 2008/0072574 A1 | 3/2008 | Masuda et al. | |
| 2011/0230331 A1 | 9/2011 | Yamashita et al. | |
| 2013/0043237 A1 | 2/2013 | Sakashita et al. | |

FOREIGN PATENT DOCUMENTS

| | | |
|---|---|---|
| EP | 1440722 A1 | 7/2004 |
| EP | 2 143 699 A1 | 1/2010 |
| JP | 08-141408 A1 | 6/1996 |
| JP | 2931362 B2 | 8/1999 |
| JP | 2007-229698 A1 | 9/2007 |
| JP | 2007-270649 A1 | 10/2007 |
| JP | 4136319 B2 | 8/2008 |
| JP | 2009-022947 A1 | 2/2009 |
| JP | 2010-001204 A1 | 1/2010 |
| JP | 2010-229976 A1 | 10/2010 |
| WO | 2008/114636 A1 | 9/2008 |
| WO | 2009/157504 A1 | 12/2009 |
| WO | 2010/061517 A1 | 6/2010 |
| WO | 2011/125817 A1 | 10/2011 |

OTHER PUBLICATIONS

Extended European Search Report (Application No. 11851819.0) dated May 13, 2015.
Chinese Office Action (Application No. 201180061181.3) dated Sep. 1, 2014.

* cited by examiner

HONEYCOMB STRUCTURE

BACKGROUND OF INVENTION

1. Field of the Invention

The present invention relates to a honeycomb structure, and more particularly, it relates to a honeycomb structure which is a catalyst carrier and also functions as a heater when a voltage is applied thereto and which has furthermore an excellent heat shock resistance.

2. Description of Related Art

Heretofore, a honeycomb structure made of cordierite onto which a catalyst is loaded has been used in treatment a harmful substance in an exhaust gas discharged from a car engine. Moreover, it is also known that a honeycomb structure formed by a sintered silicon carbide body has been used in purification of the exhaust gas (see, e.g., Patent Document 1).

An example of such a honeycomb structure is a honeycomb structure including porous partition walls and an outer peripheral wall positioned on an outermost periphery. With the porous partition walls, a plurality of cells extending from one end surface to the other end surface are formed to become through channels of a fluid.

When the exhaust gas is treated the catalyst loaded onto the honeycomb structure, a temperature of the catalyst needs to be raised to a predetermined temperature. However, the catalyst temperature is low at the start of the engine, which has caused the problem that the exhaust gas is not sufficiently purified.

To solve the problem, a method has been investigated which a heater made of a metal is disposed on an upstream side of a honeycomb structure onto which a catalyst is loaded, to raise a temperature of an exhaust gas (see, e.g., Patent Document 2).

Moreover, it has been disclosed that a honeycomb structure made of a conductive ceramic material and including both ends provided with electrodes is used as a catalyst carrier with a heater (see, e.g., Patent Document 3).

PRIOR ART DOCUMENTS

Patent Documents

Patent Document 1: JP 4136319
Patent Document 2: JP 2931362
Patent Document 3: JP-A-8-141408

SUMMARY OF THE INVENTION

In a honeycomb structure disclosed in Patent Document 2, a heater mace of a metal is disposed on an upstream side of the honeycomb structure, thereby allowing a high-temperature exhaust gas to flow through the honeycomb structure. Moreover, in a honeycomb structure disclosed Patent Document 3, electrodes are disposed at both ends of the honeycomb structure, and the honeycomb structure is heated by energization. Such honeycomb structures has the problem that cracks and the like are easily generated in an outer peripheral wall, when the honeycomb structure is heated. Moreover, the honeycomb structure has the problem that also when the honeycomb structure is simply disposed right under an engine and exposed to the high-temperature exhaust gas, the outer peripheral wall is damaged by heat shock. In the outer peripheral wall of the honeycomb structure, a maximum stress is generated. Therefore, in the honeycomb structure, an outer peripheral wall part is more remarkably damaged than a partition wall part.

Moreover, the above-mentioned metal heater to heat the honeycomb structure is mounted on a car together with the honeycomb structure, and used. In such a case, a power source for use in an electric sys em of the car is sometimes used in common with a power source of the heater. In such a case, as the power source of the heater, the power source of a high voltage of, for example, 200 V is used. However, the metal heater has a low electric resistance. In consequence, there has also been the problem that when such a high-voltage power source is used, a current excessively flows through the metal heater and sometimes damages a power source circuit.

Furthermore, when the heater is made of metal, the catalyst is not easily loaded onto the heater even if the heater is processed into a honeycomb constitution. Therefore, it has been difficult to integrate the catalyst to the heater. Additionally, when the heater is disposed on an end surface of the honeycomb structure as in Patent Document 3, the heater is directly exposed to the exhaust gas. In consequence, there has been the problem that when the honeycomb structure is used for a long period of time, the electrodes deteriorate, to increase a resistance value of each electrode portions.

The present invention has been developed in view of the above-mentioned problems, and an object thereof is to provide a honeycomb structure which is a catalyst carrier and also functions as a heater when a voltage is applied thereto and which has furthermore an excellent heat shock resistance.

To solve the above-mentioned problems, according to the present invention, the following honeycomb structure is provided.

According to a first aspect of the present invention, a honeycomb structure including a tubular honeycomb structure portion having: porous partition walls with which a plurality of cells extending from one end surface to the other end surface are formed to partition through channels of a fluid is provided, and an outer peripheral wall positioned on an outermost periphery, wherein an electrical resistivity of the partition walls is from 1 to 200 $\Omega$cm, at least a part of the outer peripheral wall is formed by a low Young's modulus portion configured to have a Young's modulus lower than the Young's modulus of the partition walls, and a ratio of the Young's modulus of the low Young's modulus portion to the Young's modulus of the partition walls is from 2 to 95%.

According to a second aspect of the present invention the honeycomb structure according to the above first aspect is provided, wherein all of the outer peripheral wall is formed by the low Young's modulus portion.

According to a third aspect of the present invention, the honeycomb structure according to the above second aspect is provided, wherein the ratio of the Young's modulus of the low Young's modulus portion to the Young's modulus of the partition walls is from 2 to 60%.

According to a fourth aspect of the present invention, the honeycomb structure according to the above second or third aspects is provided, further comprising a pair of electrode portions arranged in a band-like state in a cell extending direction of the honeycomb structure portion on a side surface of the honeycomb structure portion.

According to a fifth aspect of the present invention, the honeycomb structure according to the above fourth aspect is provided, wherein a Young's modulus of the electrode portions is lower than the Young's modulus of the partition walls.

According to a sixth aspect of the present invention. the honeycomb structure according to the above second or third aspects are provided, wherein two band-like regions of the outer peripheral wall which are arranged in the cell extending direction of the honeycomb structure portion form a pair of electrode portions having a lower electrical resistivity than the other region of the outer peripheral wall.

According to a seventh aspect of the present invention, the honeycomb structure according to any one of the above fourth to sixth aspects is Provided, wherein a Young's modulus of the electrode portions is from 0.8 to 30 GPa.

According to an eighth aspect of a present invention, the honeycomb structure according to any one of the above fourth to seventh aspects, wherein a porosity of the electrode portions is from 30 to 80%.

According to a ninth aspect of the present invention, the honeycomb structure according to any one of the above fourth to eighth aspects is provided, wherein an electrical resistivity of the electrode portions is from 0.1 to 100Ωcm.

According to a tenth aspect of the present invention, the honeycomb structure according to the above first aspect is provided, wherein a part of the outer peripheral wall is formed by the low Young's modulus portion, and a part other than the low Young's modulus portion in the outer peripheral wall is formed by a high Young's modulus portion configured to have the same Young's modulus as that of the partition walls or a Young's modulus higher than that of the partition walls.

According eleventh aspect of the present invention, the honeycomb structure according to the above tenth aspect is provided, wherein the ratio of the Young's modulus of the low Young's modulus portion to the Young's modulus of the partition walls is from 2 to 60%.

According to a twelfth aspect of the present invention, the honeycomb structure according to the above tenth or eleventh aspects is provided, further comprising:

a pair of electrode portions arranged in a band-like state in a cell extending direction of the honeycomb structure portion on a side surface of the honeycomb structure portion.

According to a thirteenth aspect of the present invention, the honeycomb structure according to the above twelfth aspect is provided, wherein the Young's modulus of the electrode portions is lower than that of the partition walls.

According to a fourteenth aspect of the present invention, the honeycomb structure according to the above twelfth or thirteenth aspects is provided, wherein the pair of electrode portions is disposed on at least the surface of the high Young's modulus portion.

According to a fifteenth aspect of the present invention, the honeycomb structure according to any one of the above twelfth to fourteenth aspects is provided, wherein the Young's modulus of the electrode portions is from 0.8 to 30 GPa.

According to a sixteenth aspect of the present invention, the honeycomb structure according to any one of the above twelfth to fifteenth aspects is provided, wherein the porosity of the electrode portions is from 30 to 80%.

According to a seventeenth aspect of the present invention, the honeycomb structure according to any one of the above twelfth to sixteenth aspects is provided, wherein the electrical resistivity of the electrode portions is from 0.1 to 100 Ωcm.

According to an eighteenth aspect of the present invention, the honeycomb structure according to any one of the above fifth to ninth and twelfth to seventeenth aspects is provided, wherein a part of the outer peripheral wall has an electrical resistivity larger than that of the electrode portions.

According to a nineteenth aspect of the present invention, the honeycomb structure according to any one of the above first to eighteenth aspects is provided, wherein the Young's modulus of the partition walls is from 20 to 45 GPa.

According to a twentieth aspect of the present invention, the honeycomb structure according to any one of the above first to nineteenth aspects is provided, wherein a porosity of the partition walls is from 30 to 60%.

According to a twenty-first aspect of the present invention, the honeycomb structure according to any one of the above first to twentieth aspects is provided, wherein the low Young's modulus portion is made of the same material as that of the partition walls.

According to a twenty-second aspect of the present invention, the honeycomb structure according to the above twenty-first aspect is provided, wherein the Young's modulus of the low Young's modulus portion is from 0.8 to 30GPa.

According to a twenty-third aspect of the present invention, the honeycomb structure according to the above twenty-first or twenty-second aspects is provided, wherein a porosity of the low Young's modulus portion is larger than that of the partition walls.

According to a twenty-fourth aspect of the present invention, the honeycomb structure according to any one of the above first to twentieth aspects is provided, wherein the low Young's modulus portion is made of a material different from that of the partition walls.

According to a twenty-fifth aspect of the present invention, the honeycomb structure according to the above twenty-fourth aspect is provided, wherein the Young's modulus of the low Young's modulus portion is from 0.6 to 30GPa.

According to a twenty-sixth aspect of the present invention, the honeycomb structure according to the above twenty-fourth or twenty-fifth aspects is provided, wherein the porosity of the low Young's modulus portion is from 30 to 80%.

The honeycomb structure of the present invention can be used as a catalyst carrier for purification of an exhaust gas. In the honeycomb structure of the present invention, the electrical resistivity of the partition walls constituting the honeycomb structure portion is from 1 to 200 Ωcm. Therefore, for example, when a voltage is applied to the partition walls, the partition wall part can generate heat and functions as a heater. In particular, the electrical resistivity of the partition walls is from 1 to 200 Ωcm, and hence even when a current is allowed to flow by use of a high-voltage power source, the current does not excessively flow. Therefore, the honeycomb structure of the present invention can remarkably suitably function as the heater. Moreover, at least a part of the outer peripheral wall is formed by the low Young's modulus portion configured to have the Young's modulus lower than that of the partition walls. Furthermore, the ratio of the Young's modulus of the low Young's modulus portion to the Young's modulus of the partition walls is from 2 to 95%. Therefore, the low Young's modulus portion alleviates a stress generated when a temperature difference occurs between the partition walls and the outer peripheral wall, for example. The honeycomb structure of the present invention has an excellent heat shock resistance, because the stress can be alleviated as described above. That is, in the honeycomb structure of the present invention, the low Young's modulus portion can function as a buffer member to alleviate the heat shock, and can enhance the heat shock resistance.

BRIEF DESCRIPTION OF THE DRAWINGS

FIG. 11 is a plan view schematically showing an electrode portion;

DETAILED DESCRIPTION OF THE INVENTION

Next, a mode for carrying out the present invention will be described in detail with reference to the drawings, but it should be understood that the present invention is not limited to the following embodiments and that design change, improvement and the like may be suitably added on the basis of ordinary knowledge of a person skilled in the art without departing from the gist of the present invention.

Figure 1:
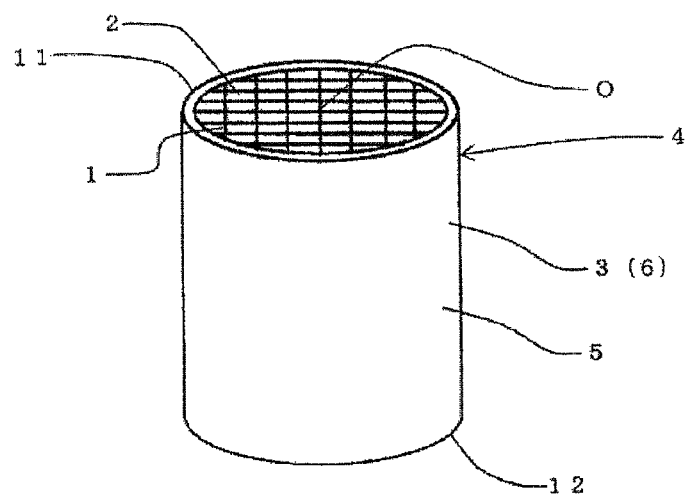
FIG. 1 is a perspective view schematically showing one embodiment of a honeycomb structure of the present invention.
Figure 2:
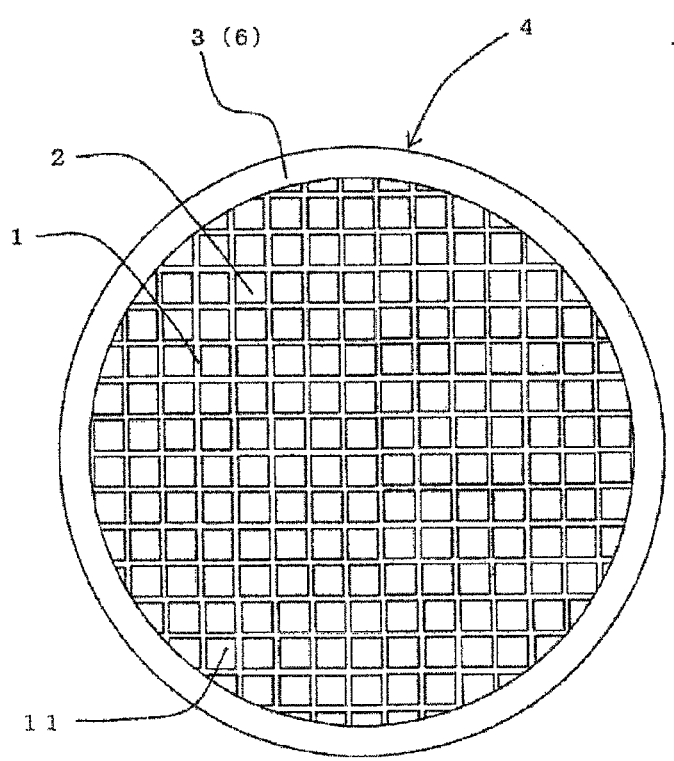
FIG. 2 is a plan view schematically showing one end surface of the one embodiment of the honeycomb structure of the present invention.
Figure 3:
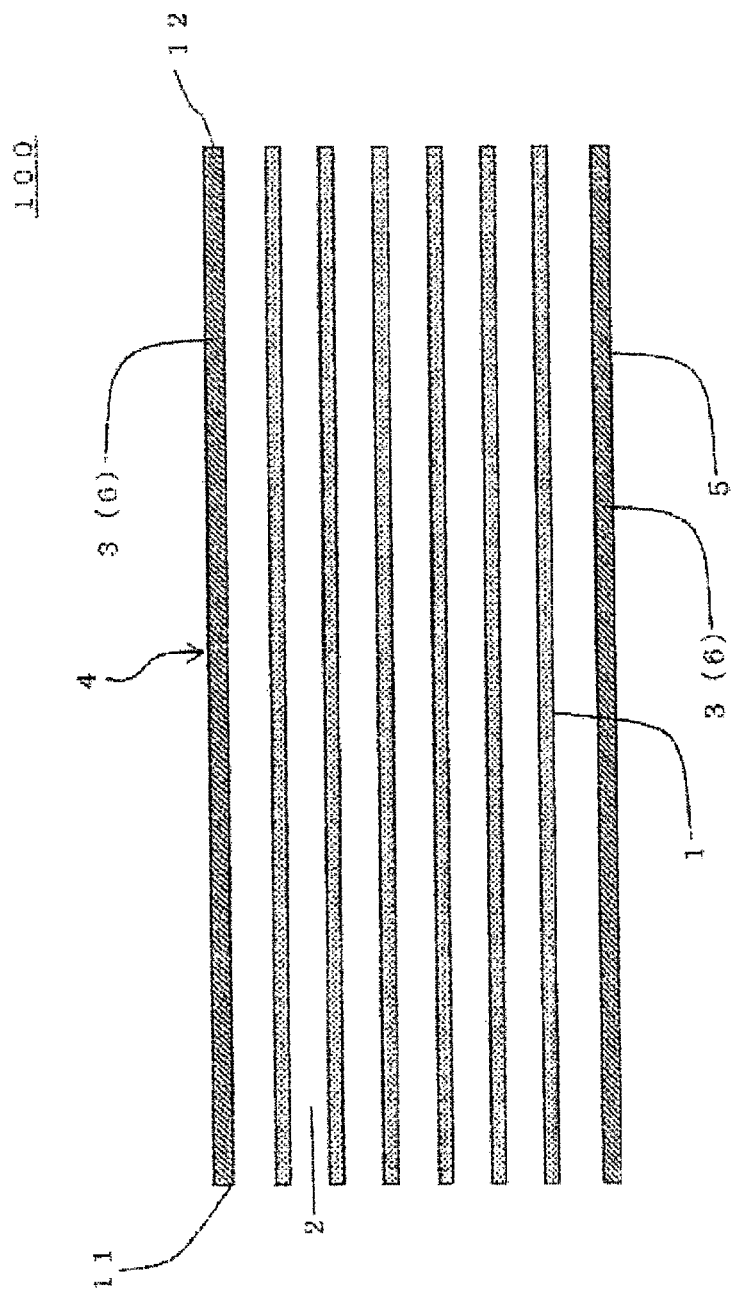
FIG. 3 is a schematic view showing a cross section of the one embodiment of the honeycomb structure of the present invention, which is parallel to a cell extending direction.

(1) Honeycomb Structure:

One embodiment of a honeycomb structure of the present invention includes a tubular honeycomb structure portion 4 as in a honeycomb structure 100 shown in FIG. 1 to FIG. 3. The honeycomb structure portion 4 has porous partition walls 1, and an outer peripheral wall 3 positioned on an outermost periphery. With the partition walls 1, a plurality of cells 2 extending from one end surface 11 to the other end surface 12 are formed to partition through channels of a fluid. In the honeycomb structure 100 of the present embodiment, an electrical resistivity the partition walls 1 is from 1 to 200 Ωcm. Moreover, at least a part of the outer peripheral wall 3 of the honeycomb structure 100 of the present embodiment is formed by a low Young's modulus portion 6 configured to have a Young's modulus lower than that of the partition walls 1. A ratio of the Young's modulus of the low You modulus portion 6 to the Young's modulus of the partition walls 1 is from 2 to 95%.

FIG. 1 is a perspective view schematically showing one embodiment of the honeycomb structure of the present invention. FIG. 2 is a plan view schematically showing the one end surface of the one embodiment of the honeycomb structure of the present invention. FIG. 3 is a schematic view showing a cross section of the one embodiment of the honeycomb structure of present invention which is parallel to a cell extending direction.

The honeycomb structure 100 of the present embodiment includes the honeycomb structure portion 4 having the porous partition walls 1 with which the plurality of cells 2 are formed. Therefore, the honeycomb structure can suitably be used as a catalyst carrier for purification of an exhaust gas. Moreover, the electrical resistivity of the partition walls 1 constituting the honeycomb structure portion 4 is from 1 to 200 Ωcm. Therefore, for example, by applying a voltage to the partition walls 1 to generate heat in the above part of the partition walls 1, the honeycomb structure can be allowed to function as a heater. In particular, the electrical resistivity of the partition walls 1 is from 1 to 200 Ωcm, and hence even when a current is allowed to flow through the partition walls 1 by use of a high-voltage power source, the current does not excessively flow through the partition walls 1. Therefore, the honeycomb structure 100 can remarkably suitably function as the heater.

Moreover, at least a part of the outer peripheral wall 3 is formed by the low Young's modulus portion 6 configured to have a Young's modulus lower than that of the partition walls 1. Furthermore, the ratio of the Young's modulus of the low Young's modulus portion 6 to the Young's modulus of the partition walls 1 is from 2 to 95%. Therefore, the low Young's modulus portion 6 can alleviate, for example, a stress generated when a temperature difference occurs between the partition walls 1 and the outer peripheral wall 3. In consequence, the honeycomb structure 100 having an excellent heat shock resistance can be achieved. That is, the low Young's modulus portion 6 can function as a buffer member to alleviate the heat shock, and enhance the heat shock resistance of the honeycomb structure 100. When the ratio of the Young's modulus of the low Young's modulus portion 6 to the Young's modulus of the partition walls 1 is smaller than 2%, the outer peripheral wall has a deteriorated strength and is easily damaged. When the ratio of the Young's modulus of the low Young's modulus portion 6 to the Young's modulus of the partition walls 1 is in excess of 95%, the outer peripheral wall is easily damaged by the heat shock. In particular, the damages remarkably increase to such an extent as change a resistance value of the honeycomb structure sometimes. When such damages are caused, it is difficult to use the honeycomb structure as a heater or the like sometimes.

The Young's modulus of the partition walls is a value measured by a bending resonance method in conformity to JIS 81602. As a test piece for use in the measurement, there is used a test piece obtained by cutting, into a size of 20 mm×10 mm×100 mm, a portion of the honeycomb structure portion which is provided with the partition walls. Moreover, when it is difficult to measure the Young's modulus by the bending resonance method, a four-point bending method can be used as an alternative method.

Moreover, the Young's modulus of the outer peripheral wall is a value measured by the bending resonance method in conformity to JIS 81602. As a test piece for use in the measurement, there is used a test piece obtained by preparing a bulk body using a raw material which forms the outer peripheral wall and cutting this bulk body into a size of 3 mm×4 mm×40 mm. When the Young's modulus of the outer peripheral wall partially varies, the test piece is prepared by using a material which constitutes respective portions of the outer peripheral wall, to measure the Young's modulus of each of the portions. That is, when the outer peripheral wall is constituted of the low Young's modulus portion and a high Young's modulus portion or when the low Young's modulus portion has two or more regions having different Young's moduli as described later, the test piece is prepared for each portion or each region by the above method. Moreover, when it is difficult to measure the Young's modulus by the bending resonance method, the four-point bending method can be used as the alternative method.

FIG. 1 to FIG. 3 show an example where all of the outer peripheral wall 3 positioned on the outermost periphery of the honeycomb structure portion 4 is formed by the low Young's modulus portion 6. For example, such a low Young's modulus portion can be prepared by applying, to outer peripheral portions of the partition walls, a coating material which is dried and fired to have a Young's modulus lower than that of the partition walls. Moreover, as the coating material to form the low Young's modulus portion, it is possible to use a material which is the same material as that of the partition walls but has a decreased Young's modulus due to its increase in porosity. The partition walls which are not provided with the outer peripheral wall can be prepared by the following method. First, honeycomb structure portion is prepared in which the outer peripheral portions of the partition walls are provided with a temporary outer peripheral wall made of the same material as that of the partition walls. The above temporary outer peripheral wall may have the same Young's modulus as that of the partition walls. Next, the outer peripheral portions provided with this temporary outer peripheral wall is ground, to prepare the partition walls which are not provided with the outer peripheral wall.

Figure 4:
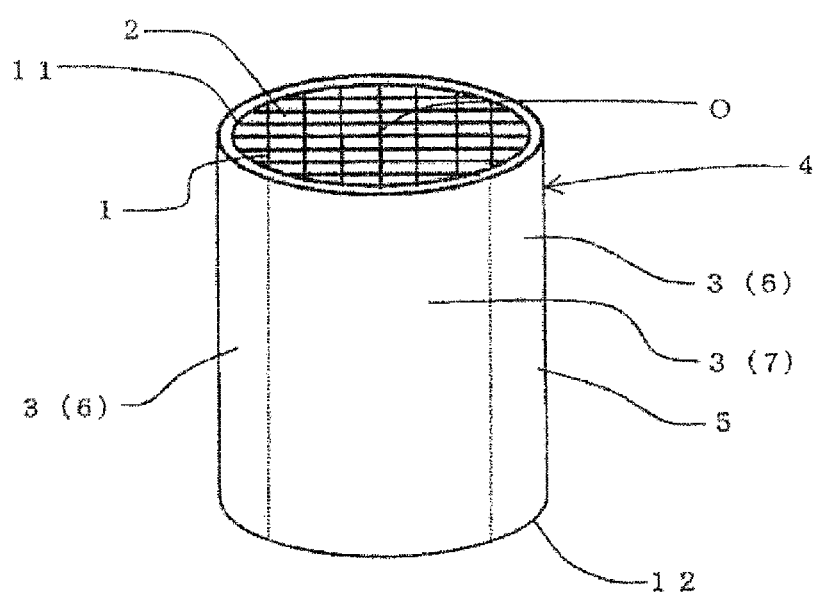
FIG. 4 is a perspective view schematically showing another embodiment of the honeycomb structure of the present invention.
Figure 5:
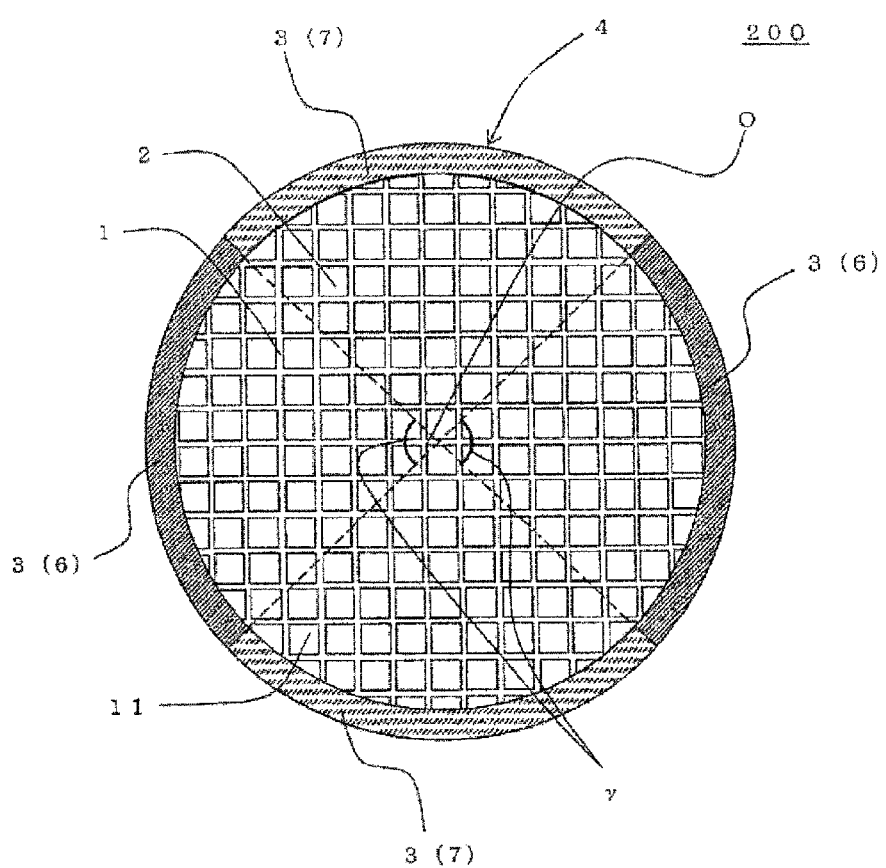
FIG. 5 is a plan view schematically showing one end surface of the another embodiment of the honeycomb structure of the present invention.

In the honeycomb structure of the present embodiment, all of the outer peripheral wall does not have to be formed by the low Young's modulus portion. That is, a part of the outer peripheral wall of the honeycomb structure may be formed by the low Young's modulus portion. For example, as in a honeycomb structure 200 shown in FIG. 4 and FIG. 5, a part of an outer peripheral wall 3 may be formed by a low Young's modulus portion 6, and a part other than the low Young's modulus portion 6 in the outer peripheral wall 3 may be formed by a high Young's modulus portion 7. The low Young's modulus portion 6 is a portion having a Young's modulus lower than that of partition walls 1. The high Young's modulus portion 7 is an outer peripheral wall made of the same material as that of the partition walls 1, or an outer peripheral wall made of a material having a Young's modulus higher than that of the partition walls 1. Here, FIG. 4 is a perspective view schematically showing another embodiment of the honeycomb structure of the present invention. FIG. 5 is a plan view schematically showing one end surface of the another embodiment of she honeycomb structure of the present invention.

When the outer peripheral wall 3 is constituted of the low Young's modulus portion 6 and the high Young's modulus portion 7, each of the low Young's modulus portion 6 and the high Young's modulus portion 7 is preferably formed into a band-like shape disposed in an extending direction of cells 2 of a honeycomb structure portion 4. In the honeycomb structure 200 shown in FIG. 4 and FIG. 5, two band-like low Young's modulus portions 6 and two band-like high Young's modulus portions 7 are alternately formed in a peripheral direction of the honeycomb structure portion 4. According to such a constitution, the low Young's modulus portion 6 constituting a part of the cuter peripheral wall 3 alleviates a stress generated when a temperature difference occurs between the partition walls 1 and the outer peripheral wall 3. In consequence, a heat shock resistance of the honeycomb structure 200 can be enhanced.

Such a low Young's modulus portion can be prepared by applying, to outer peripheral portions of the partition walls, a coating material which is dried and fired to have a Young's modulus lower than that of the partition walls. On the other hand, the high Young's modulus portion can be prepared, for example, by retaining, as the above high Young's modulus portion, an outer peripheral wall portion made of the same material as that of the partition walls without grinding the outer peripheral wall portion. Moreover, the high Young's modulus portion can separately be prepared by using a coating material which is dried and fired to have the same Young's modulus as that of the partition walls or a Young's modulus higher than that of the partition walls. Such a coating material is applied to a section other than the low Young's modulus portion in the outer peripheral portions of the partition walls, so that the high Young's modulus portion can be prepared.

Figure 18:
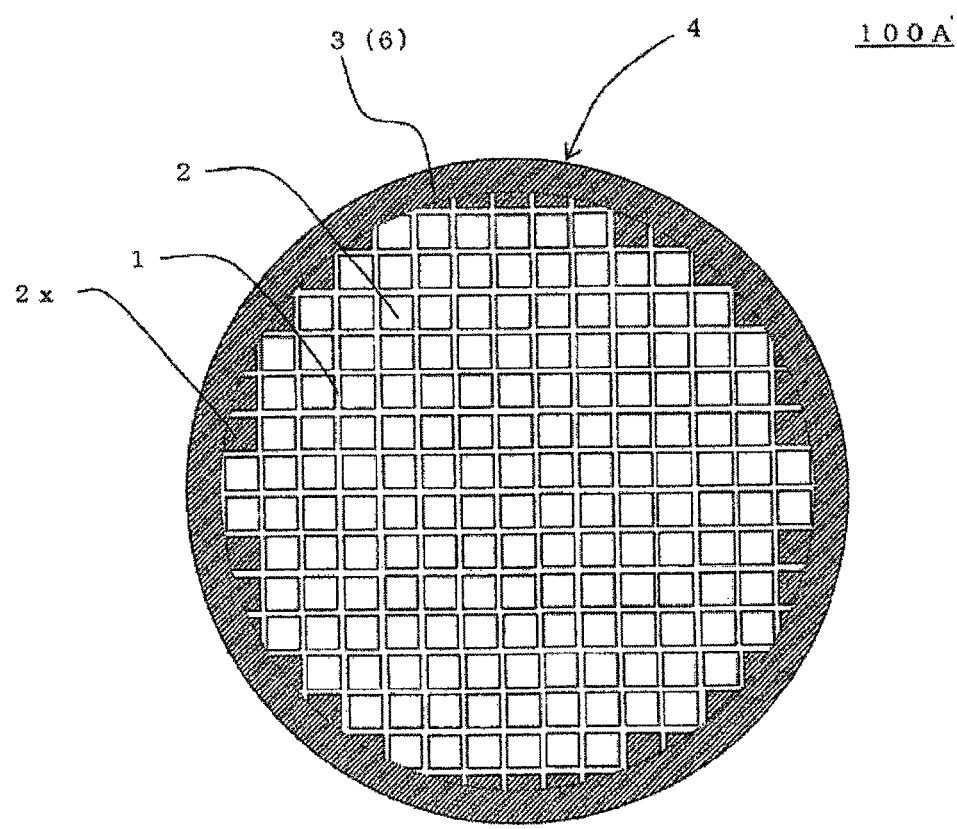
FIG. 18 is a schematic view showing a cross section of a yet another embodiment of the honeycomb structure of the present invention, which is perpendicular to the cell extending direction.

Hereinafter, a preparing method of the low Young's modulus portion will be described in more detail. First, the honeycomb structure portion having the outer peripheral wall made of the same material as that of the partition walls, i.e., the outer peripheral wall having the same Young's modulus as that of the partition walls is once prepared. Next, the outer peripheral portion of the obtained honeycomb structure portion is ground. Next, the coating material having a Young's modulus lower than that of the partition walls is applied to the ground portion to prepare the low Young's modulus portion. In this case, a ground outermost peripheral portion of the honeycomb structure portion may have incomplete cells that a part of a periphery of the cell not formed with the partition walls sometimes. In the applying of the coating material to form, the above low Young's modulus portion, the coating material is preferably applied so as to fill the coating material into these incomplete cells. That is, even the inside of the incomplete cells are preferably provided with the low Young's modulus portion. According to such a constitution, a strength of the honeycomb structure portion can be enhanced. For example, as in a honeycomb structure 100A shown in FIG. 18, the coating material to constitute an outer peripheral wall 3 may be filled into an incomplete cell 2x. In FIG. 18, all of the outer peripheral wall 3 is formed by a low Young's modulus portion 6, and hence the coating material to constitute the low Young's modulus portion 6 is filled into the incomplete cell 2x. In the incomplete cell 2x, a part of a periphery of a cell. 2 is not formed with a partition walls 1. Here, FIG. 18 is a schematic view showing a cross section of a yet another embodiment of the honeycomb structure of the present invention which is perpendicular to the cell extending direction. When the inside of the incomplete cell 2x is provided with the outer peripheral wall 3 as described above, "a thickness of the outer peripheral wall 3" is a thickness of the outer peripheral wall 3 disposed on an outer side of a region formed by connecting outermost peripheral points of the partition walls 1 in the cross section perpendicular to the extending direction of the cells 2. The outermost peripheral points of the partition walls 1 include the partition walls 1 which are provided with the incomplete cells 2x.

When the outer peripheral wall is constituted of the low Young's modulus portions and the high Young's modulus portions, the band-like low and high Young's modulus portions are preferably alternately formed in the peripheral direction of the honeycomb structure portion. The honeycomb structure 200 shown in FIG. 4 and FIG. 5 is the example where two low Young's modulus portions 6 and two Young's modulus portions 7 are alternately formed in the peripheral direction of the honeycomb structure portion 4. The number of the low Young's modulus portions 6 or the Young's modulus portions 7 is not limited to two as shown in FIG. 4 and FIG. 5. When electrode portions are formed in the honeycomb structure as described later, two low Young's modulus portions 6 and two Young's modulus portions 7 are preferably alternately formed in the peripheral direction of the honeycomb structure portion 4 under consideration of portions to be provided with the electrode portions.

The low Young's modulus portion is preferably formed in a region having 20% or more of an area of the surface of the outer peripheral wall. Hereinafter, a, ratio of areas of the low Young's modulus portions to the area of the outer peripheral wall surface is called the area ratio of the low Young's modulus portions" sometimes. When the above-mentioned area ratio of the low Young's modulus portions is, for example, smaller than 20%, portions to alleviate a heat stress in the outer peripheral wall decrease. In consequence, the heat shock resistance of the honeycomb structure might not sufficiently enhance. A maximum value of the above area ratio of the low Young's modulus portions is 100% in a case where all of the outer peripheral wall is constituted of the low Young's modulus portion as shown in FIG. 1 to FIG. 3.

In FIG. 4 and FIG. 5, each of the low Young's modulus portions 6 and the Young's modulus portions 7 is formed into a band-like shape in the cell extending direction. In such a case, a ratio of a sum of lengths of the low Young's modulus portions 6 in the peripheral direction to the length of the honeycomb structure portion 4 in the peripheral direction (i.e., the ratio in the peripheral direction) is preferably 10% or more, further preferably 20% or more, and especially preferably 30% or more. The sum of the lengths of the low Young's modulus portions 6 in the peripheral direction is a sum of widths of the band-like low Young's modulus portions 6. When the sum of the lengths of the low Young's modulus portions in the peripheral direction is, for example, smaller than 10% of the length of the honeycomb structure portion in the peripheral direction, the portions to alleviate the heat stress decrease sometimes. In consequence, the heat shock resistance of the honeycomb structure might not sufficiently enhance.

Moreover, when two low Young's modulus portions 6 and two high Young's modulus portions 7 are alternately formed in the peripheral direction of the honeycomb structure portion 4 as shown in FIG. 4, the low Young's modulus portions 6 preferably have the following constitution. In the cross section perpendicular to the extending direction of the cells 2, a center angle γ of each of the low Young's modulus portions 6 is preferably from 15 to 160°, further preferably from 25 to 140°, and especially preferably from 35 to 120°. According to such a constitution, a deviation of arrangement of the low Young's modulus portions 6 in the peripheral direction (i.e., the peripheral direction of the honeycomb structure portion 4) decreases. In consequence, it is possible to suitably alleviate the heat stress along the peripheral direction of the honeycomb structure portion 4. When the center angle γ is, for example, smaller than 15°, the portions to alleviate the heat stress decrease, and the heat shock resistance of the honeycomb structure does not sufficiently enhance sometimes. Moreover, in the honeycomb structure of the present invention, all of the outer peripheral wall may be formed by the above low Young's modulus portion. Therefore, the maximum value of the center angle γ of each of the low Young's modulus portions 6 is 180°. That is, the total of the center angles γ of the two low Young's modulus portions 6 is 360°. From the viewpoint of the enhancement of the heat shock resistance, there is not any special restriction on an upper limit of the center angle γ. However, when the center angle γ is in excess of 160°, the high Young's modulus portion having a remarkably small center angle should be disposed, which may result in a laborious manufacturing process.

The honeycomb structure 200 of FIG. 4 and FIG. 5 has the high Young's modulus portion 7 configured to have the same Young's modulus as that of the partition walls 1 or a Young's modulus higher than that of the partition walls. In the honeycomb structure of the present invention, as shown in, for example, FIG. 2, all of the outer peripheral wall 3 is formed by the low Young's modulus portion 6, and furthermore, the low Young's modulus portion 6 may have two or more regions having different Young's moduli. For example, as in a honeycomb structure 300 shown in FIG. 6 and FIG. 7, all of the outer peripheral wall 3 may be formed by a low Young's modulus portion 6 configured to have a Young's modulus lower than that of partition walls 1. In the honeycomb structure 300 shown in FIG. 6 and FIG. 7, the low Young's modulus portion 6 is constituted of a first low Young's modulus portion ha and a second low Young's modulus portion 6b. The first low Young's modulus portion 6a has a Young's modulus lower than that of the partition wars 1. The second low Young's modulus portion 6b has a Young's modulus which is lower than that of the partition walls 1 and is further lower than that of the first low Young's modulus portion 6a.

Figure 6:
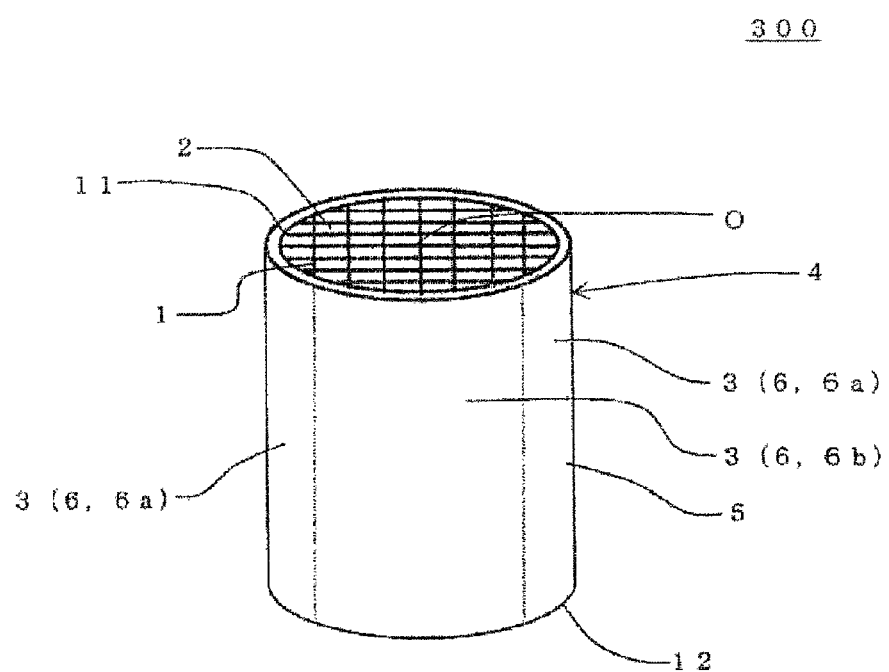
FIG. 6 is a perspective view schematically showing a yet another embodiment of the honeycomb structure of the present invention.
Figure 7:
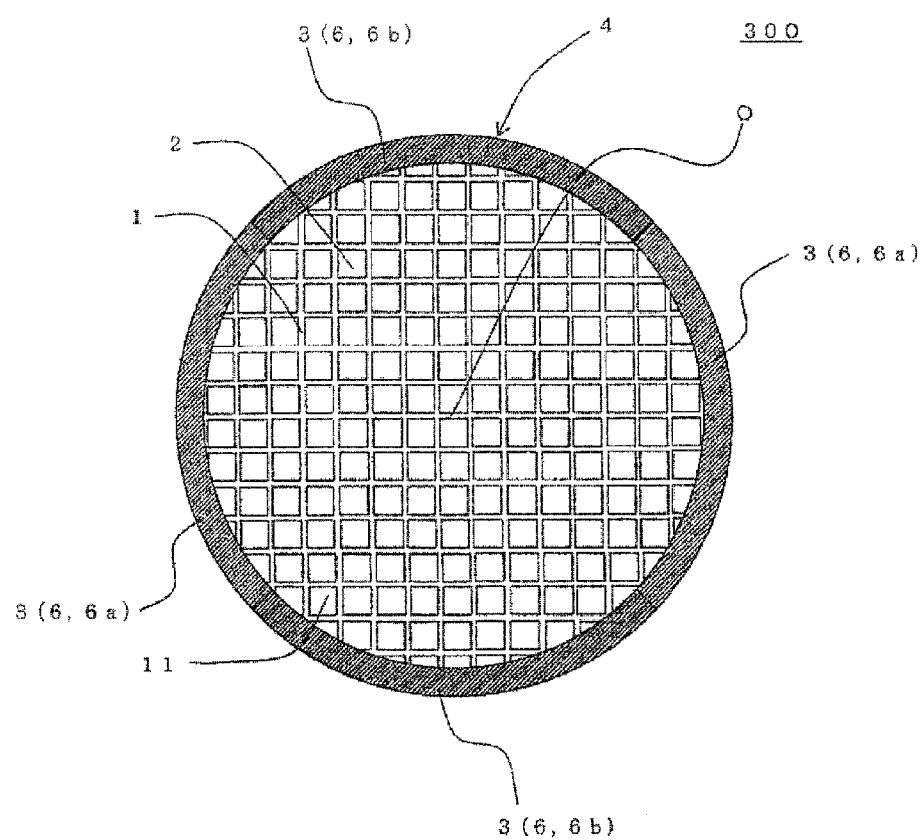
FIG. 7 is a plan view schematically snowing one end surface of the yet another embodiment of the honeycomb structure of the present invention.

Here, FIG. 6 is a perspective view schematically showing yet another embodiment of the honeycomb structure of the present invention. FIG. 7 is a plan view schematically showing one end surface of the yet another embodiment of the honeycomb structure of the present invention.

Also when the outer peripheral wall is constituted of the first low Young's modulus portions and the second low Young's modulus portions as described above, the first low Young's modulus portions and the second low Young's modulus portions are preferably alternately arranged in a band-like state in the cell extending direction of the honeycomb structure portion. According to such a constitution, the first low Young's modulus portions and the second low Young's modulus portions function as buffer members to alleviate the heat shock, respectively. Consequently, the heat shock resistance of the honeycomb structure can be enhanced. In particular, the outer peripheral wall is constituted of a soft portion (e.g., the first low Young's modulus portion) and a further soft portion (e.g., the second low Young's modulus portion). In consequence, each portion can suitably alleviate the stress in accordance with temperature conditions at heating of the honeycomb structure, and a suitable heat shock resistance can be realized.

FIG. 6 and FIG. 7 show an example where two first low Young's modulus portions 6a and two second low Young's modulus portions 6b, each having band-like shape disposed in the extending direction of cells 2, are alternately formed in the peripheral direction of a honeycomb structure portion 4. The shape and size of each of the first low Young's modulus portion 6a and the second low Young's modulus portion 6b are not limited to the configuration shown in FIG. 6 and FIG. 7.

In the honeycomb structure of the present embodiment, a ratio of the Young's modulus of the low Young's modulus portions to the Young's modulus of the partition walls is preferably from 2 to 60%, further preferably from 2 to 50%, and especially preferably from 2 to 40%. Hereinafter, the ratio of the Young's modulus of the low Young's modulus portion to the Young's modulus of the partition walls will simply be called "the ratio of the Young's modulus" sometimes. According to such a constitution, the low Young's modulus portions constituting the outer peripheral wall suitably alleviate a stress generated when a temperature difference occurs between the partition walls and the cuter peripheral wall. In consequence, the heat shock resistance of the honeycomb structure can suitably be enhanced. For example, when the above ratio of the Young's modulus is smaller than 2%, the outer peripheral wall has a deteriorated strength, and is easily damaged. Moreover, when the above ratio of the Young's modulus is in excess of 60%, the low Young's modulus portion has a comparatively high Young's modulus, and cannot sufficiently alleviate the heat shock sometimes. This ratio of the Young's modulus is a condition which is applied to both of a case where all of the outer peripheral wall is formed by the low Young's modulus portion and a case where the outer peripheral wall is formed by the low Young's modulus portion and the high Young's modulus portion.

(Constitution Further Including a Pair of Electrode Portions)

The honeycomb structure of the present embodiment may further include a pair of electrode portions on a side surface of the honeycomb structure portion. The pair of electrode portions are arranged in a hand-like state in the cell extending direction of the honeycomb structure portion. Here, in a honeycomb structure 400 shown in FIG. 8 to FIG. 10, all of an outer peripheral wall 3 positioned on the outermost periphery of the honeycomb structure portion 4 is formed by a low Young's modulus portion 6. On the side surface of the outer peripheral wall 3 constituted of the low Young's modulus portion 6, a pair of band-like electrode portions 21 and 21 are arranged in an extending direction of cells 2 of the honeycomb structure portion 4.

In the honeycomb structure 400 of the present embodiment, as described above, an electrical resistivity of the honeycomb structure portion 4 is from 10 to 200 Ωcm. Therefore, even when a current is allowed to flow by use of a high-voltage power source, the current does not excessively flow through partition walls 1. Therefore, the honeycomb structure 400 can suitably be used as a heater. Moreover, the pair of band-like electrode portions 21 and 21 are arranged in the extending direction of the cells 2 of the honeycomb structure portion 4, and hence when a voltage is applied between the pair of electrode portions 21 and 21, heat can suitably be generated in the honeycomb structure portion 4.

In a cross section of the honeycomb structure 400 of the present embodiment which perpendicular to the extending direction of the cells 2, the one electrode portion 21 in the pair of electrode portions 21 and 21 is preferably disposed on a side opposite to the other electrode portion 21 in the pair of electrode portions 21 and 21 via a center O of the honeycomb structure portion 4. According to such a constitution, when the voltage is applied from the one electrode portion 21 toward the other electrode portion 21, the voltage is evenly applied to the whole honeycomb structure portion 4. Therefore, a deviation of a temperature distribution of the honeycomb structure portion 4 can be suppressed.

Figure 10:
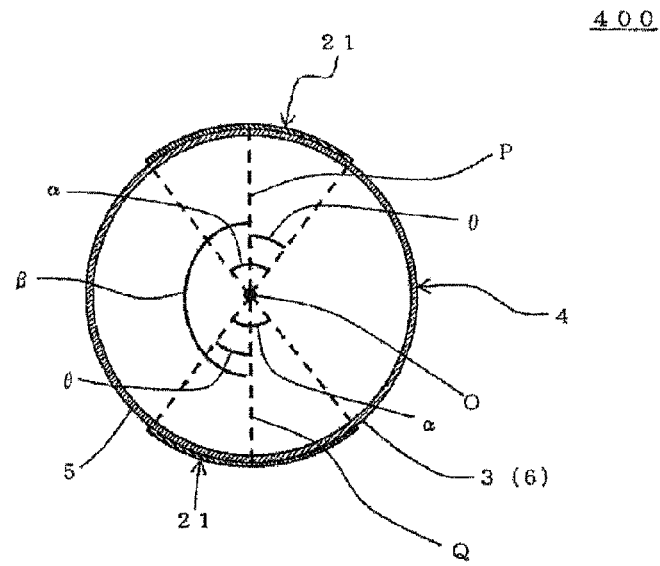
FIG. 10 is a schematic view showing a cross section of the yet another embodiment of the honeycomb structure of the present invention, which is perpendicular to the cell extending direction.

In the cross section of the honeycomb structure 400 of the present embodiment which is perpendicular to the extending direction of the cells 2, the one electrode portion 21 is disposed on the side opposite to the other electrode portion 21 via the center O of the honeycomb structure portion 4, and additionally, the respective electrode portions 21 and 21 preferably have the following constitution. In the cross section of the honeycomb structure 400 of the present embodiment which is perpendicular to the extending direction of the cells 2, 0.5 time a center angle α of each of the electrode portions 21 and 21 is further preferably from 15 to 65°, and especially preferably from 30 to 60°. According to such a constitution, the above-mentioned deviation of the temperature distribution of the honeycomb structure portion 4 can more suitably be suppressed. In FIG. 10, the above-mentioned angle of 0.5 time the center angle α of the electrode portion 21 is shown as an angle θ.

Figure 8:
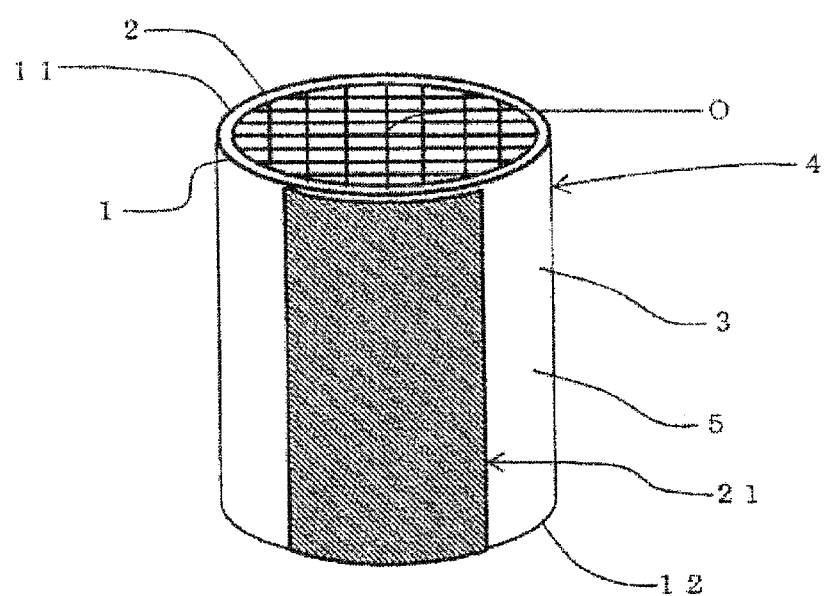
FIG. 8 is a perspective view schematically showing a yet another embodiment of the honeycomb structure of the present invention.
Figure 9:
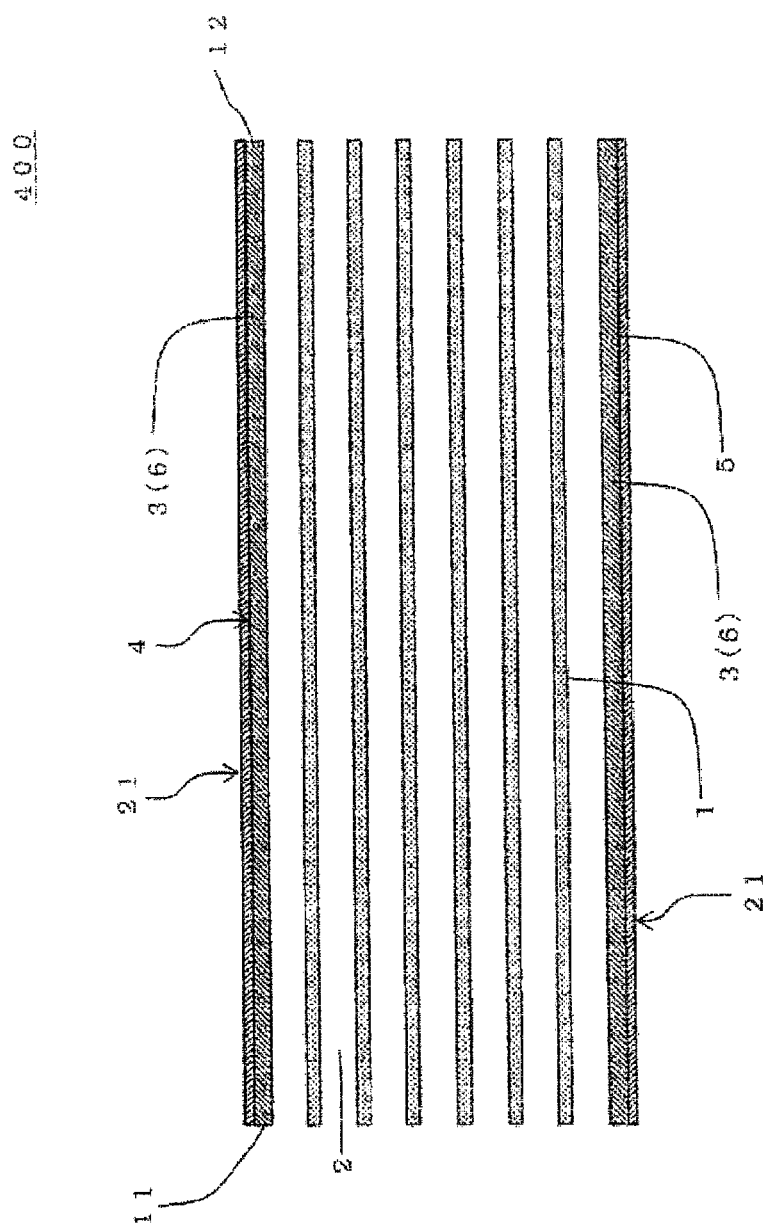
FIG. 9 is a schematic view showing a cross section of the yet another embodiment of the honeycomb structure of the present invention, which is parallel to the cell extending direction.

Here, FIG. 8 is a perspective view schematically showing a yet another embodiment of the honeycomb structure of the present invention. FIG. 9 is a schematic view showing a cross section of the yet another embodiment of the honeycomb structure of the present invention which is parallel to the cell extending direction. FIG. 10 is a schematic view showing a cross section of the yet another embodiment of the honeycomb structure of the present invention which is perpendicular to the cell extending direction.

Hereinafter, the constitution where "in the cross section perpendicular to the extending direction of the cells 2, the one electrode portion 21 in the pair of electrode portions 21 and 21 is disposed on the side opposite to the other electrode portion 21 in the pair of electrode portions 21 and 21 via the center O of the honeycomb structure portion 4" will be described in detail. First, in the cross section perpendicular to the extending direction of the cells 2, a line segment connecting the center point of the one electrode portion 21 to the center O of the honeycomb structure portion 4 is "a line segment (P)". Moreover, in the cross section perpendicular to the extending direction of the cells 2, a line segment connecting the center point of the other electrode portion 21 to the center O of the honeycomb structure portion 4 is "a line segment (Q)". The center point of each of the one electrode portion 21 and the other electrode portion 21 is the center point of the honeycomb structure portion 4 in a peripheral direction. Moreover, "the opposite side via the center O of the honeycomb structure portion 4" means a positional relation in which an angle β formed between the line segment (P) and the line segment (Q) is in a range of 170° to 190°. Therefore, in the above-mentioned constitution, the pair of electrode portions 21 and 21 are arranged in such a positional relation as to satisfy the above range of the angle β.

As shown in FIG. 10, "the center angle α of the electrode portion 21" is an angle formed between two line segments connecting both ends of the electrode portion 21 to the center O of the honeycomb structure portion 4 in the cross section perpendicular to the cell extending direction. That is, the center angle α is an inner angle of a portion of the center O in a shape formed by "the electrode portion 21", "the line segment connecting one end of the electrode portion 21 to the center O", and "the line segment connecting the other end of the electrode portion 21 to the center O" in the cross section perpendicular to the extending direction of the cells 2. The shape formed by the above respective line segments is, for example, a fan shame.

Moreover, "the angle θ of 0.5 time the center angle α" of the one electrode portion 21 is preferably a size of 0.8 to 1.2 time "the angle θ of 0.5 time the center angle α" of the other electrode portion 21, and further preferably a size of 1.0 rime (i.e., the same size). Consequently, when the voltage is applied between the pair of electrode portions 21 and 21, the deviation of the current flowing through the honeycomb structure portion 4 can be suppressed. In consequence, the deviation of the heat generation in the honeycomb structure portion 4 can be suppressed.

There is not any special restriction on the Young's modulus of the electrode portions, but in the honeycomb structure of the present embodiment, the Young's modulus of the electrode portion is preferably the same as that of the partition walls, or lower than that of the partition walls. According to such a constitution, the heat stress of the outer peripheral wall can be alleviated. In consequence, the heat shock resistance of the honeycomb structure can further be enhanced.

(Constitution where a Pair of Electrode Portions are Formed by an Outer Peripheral Wall)

Figure 11:
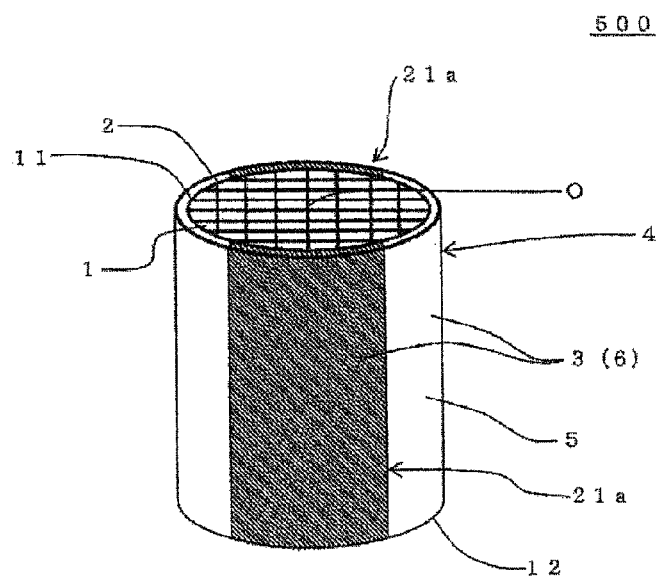
FIG. 11 is a perspective view showing a yet another embodiment of the honeycomb structure of the present invention.
Figure 12:
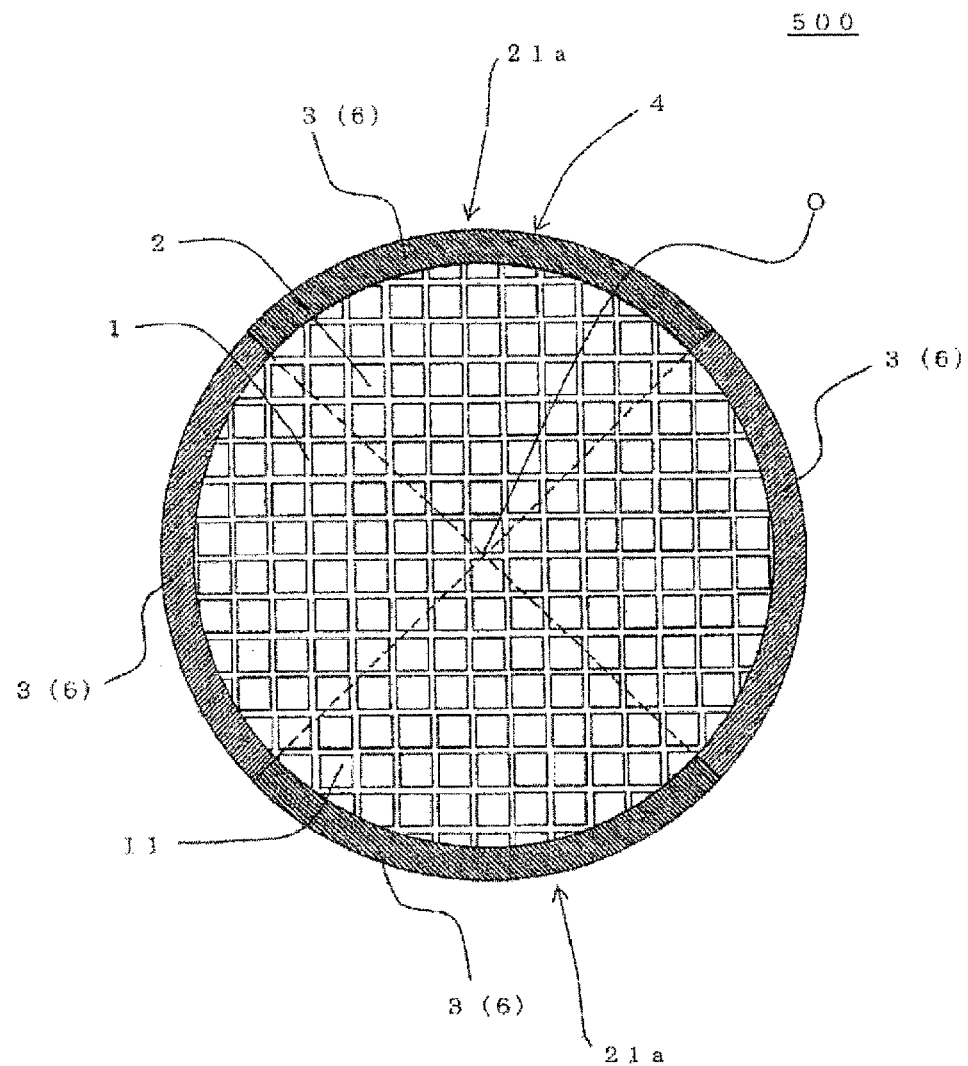
FIG. 12 is a schematic view showing a cross section of the yet another embodiment of the honeycomb structure of the present invention, which is perpendicular to a cell extending direction.

In the honeycomb structure of the present invention, as shown in FIG. 11 and FIG. 12, two band-like regions of an outer peripheral wall 3 which extend in an extending direction of cells 2 of a honeycomb structure portion 4 may have an electrical resistivity lower than that of the other region of the outer peripheral wall 3. The regions having the low electrical resistivity form a pair of electrode portions 21a and 21a.

That is, in a honeycomb structure 500 shown in FIG. 11 and FIG. 12, all of an outer peripheral wall 3 is formed by a low Young's modulus portion 6. Moreover, a part of the low Young's modulus portion 6 is formed by using a material which also serves as the pair of electrode portions 21a and 21a arranged in a band-like state in the extending direction of the cells 2 of the honeycomb structure portion 4. Consequently, a part of the outer peripheral wall 3 is provided with the pair of electrode portions 21a and 21a. In consequence, similarly to the honeycomb structure 400 shown in FIG. 8 to FIG. 10, when a voltage is applied between the pair of electrode portions 21a and 21a, heat can suitably be generated in the honeycomb structure portion 4. Here, FIG. 11 is a perspective view showing this further embodiment of the honeycomb structure of the present invention. FIG. 12 is a schematic view showing a cross section of the embodiment of the honeycomb structure of the present invention which is perpendicular to a cell extending direction.

It can be considered that the honeycomb structure 500 shown in FIG. 11 and FIG. 12 is the following embodiment, as compared with the honeycomb structure 400 shown in FIG. 8 to FIG. 10. That is, it can be considered that the honeycomb structure 500 shown in FIG. 11 and FIG. 12 is an embodiment in which the outer peripheral wall 3 of a region provided with the pair of electrode portions 21a and 21a is not present, and the pair of electrode portions 21a and 21a are arranged directly around partition walls 1. The pair of electrode portions 21a and 21a also serve as a part of the low Young's modulus portion 6 constituting the outer peripheral wall 3. In consequence, the pair of electrode portions 21a and 21a have a Young's modulus lower than a Young's modulus of the partition walls 1.

In the pair of electrode portions 21a and 21a of the honeycomb structure 500, the one electrode portion 21a is preferably disposed on a side opposite to the other electrode portion 21a in the pair of electrode portions 21a and 21a via a center O of the honeycomb structure portion 4. Furthermore, in a cross section perpendicular to the extending direction of the cells 2, an angle of 0.5 time a center angle α of each of the electrode portions 21a and 21a is further preferably from 15 to 65°, and especially preferably from 30 to 60°. According to such a constitution, a deviation of a temperature distribution of the honeycomb structure portion 4 can suitably be suppressed. The center angle α and an angle θ of 0.5 time the center angle α are angles defined in the same manner as in the center angle α and the angle θ shown in FIG. 10.

(Another Constitution Including a Pair of Electrode Portions)

Figure 13:
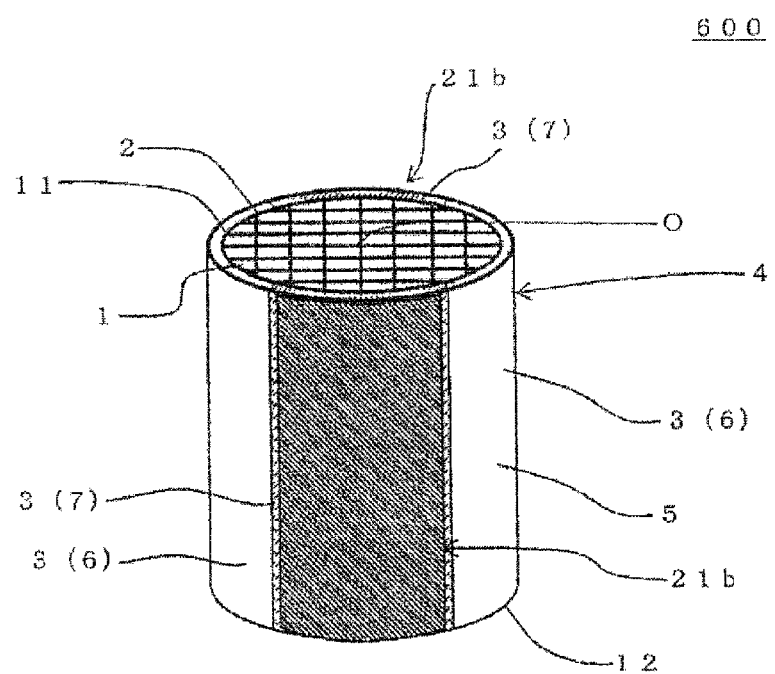
FIG. 13 is a perspective view schematically showing a yet another embodiment of the honeycomb structure of the present invention.
Figure 14:
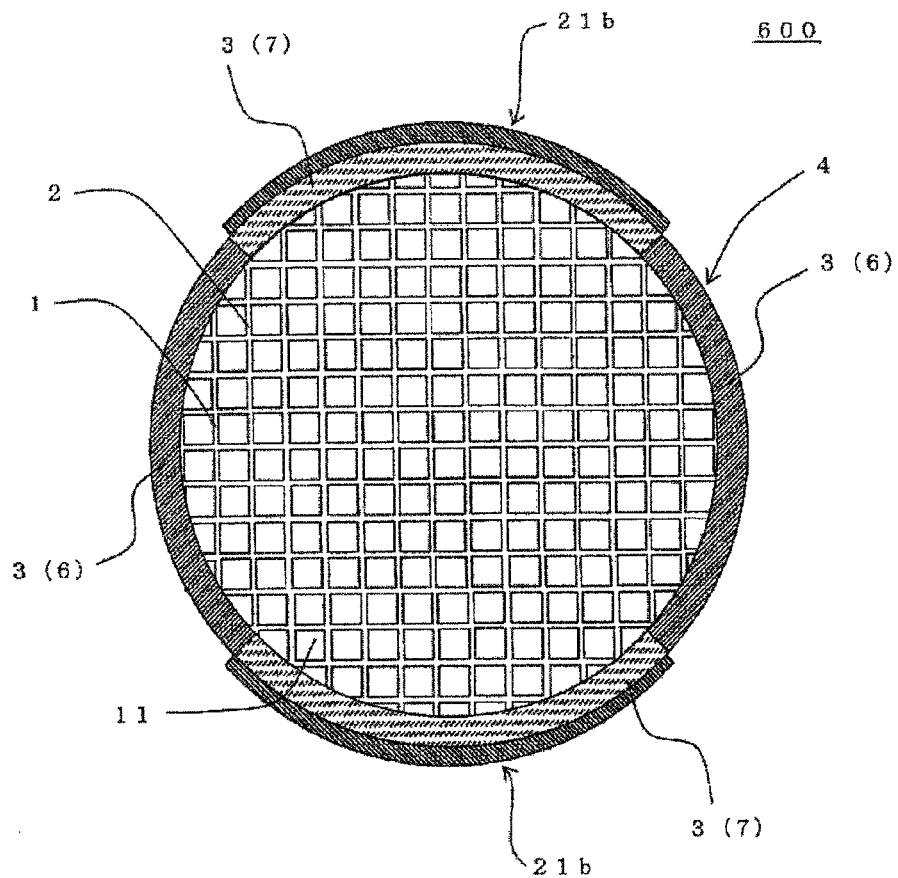
FIG. 14 is a schematic view showing a cross section of the yet another embodiment of the honeycomb structure of the present invention, which is perpendicular to a cell extending direction.

Moreover, even when an outer peripheral wall of a honeycomb structure portion is formed by a low Young's modulus portion and a high Young's modulus portion, the honeycomb structure portion may further include a pair of electrode portions. For example, FIG. 13 and FIG. 14 show an example of a honeycomb structure 600 further including a pair of electrode portions 21b and 21b arranged in a band-like state in an extending direction of cells 2 of a honeycomb structure portion 4 on a side surface of the honeycomb structure portion 4. FIG. 13 is a perspective view schematically showing a yet another embodiment of the honeycomb structure of the present invention. FIG. 14 is a schematic view showing a cross section of the yet another embodiment of the honeycomb structure of the present invention which is perpendicular to a cell extending direction.

In the honeycomb structure 600, a part of an outer peripheral wall 3 is formed by a low Young's modulus portion 6. Therefore, also in the honeycomb structure 600 further including the above-mentioned pair of electrode portions 21b and 21b, a neat stress can be alleviated by the low Young's modulus portion 6. Consequently, the honeycomb structure 600 has an excellent heat shock resistance. The honeycomb structure portion 4 of the honeycomb structure 600 has a constitution similar to that of the honeycomb structure 200 shown in FIG. 4 and FIG. 5.

In the honeycomb structure 600, the pair of electrode portions 21b and 21b are preferably arranged on the surface of a high Young's modulus portion 7 constituting the outer peripheral wall 3. According to such a constitution, the surfaces of the low Young's modulus portions 6 are open. Therefore, the heat stress can suitably be alleviated by the low Young's modulus portions 6. For example, in the honeycomb structure 600, the electrode portion 21b is preferably configured to have about the same surface area as that of the high Young's modulus portion 7, or a surface area smaller than that of the high Young's modulus portion. Moreover, the respective electrode portions 21b are preferably arranged to cover the surfaces of the high Young's modulus portions 7. When the honeycomb structure has two low Young's modulus portions having different Young's moduli as in the honeycomb structure 300 shown in FIG. 6 and FIG. 7, the electrode portion is disposed on the surface of the low Young's modulus portion having a relatively higher Young's modulus, so that an effect similar to the above effect can be obtained. On the other hand, when the electrode portion is disposed on the surface of the low Young's modulus portion having a relatively lower Young's modulus, a strength of the outer peripheral wall can be enhanced.

Moreover, the one electrode portion 21b in the pair of electrode portions 21b and 21b is preferably disposed on a side opposite to the other electrode portion 21b in the pair of electrode portions 21b and 21b via a center O of the honeycomb structure portion 4. Furthermore, in a cross section perpendicular to the extending direction of the cells 2, an angle of 0.5 time a center angle α of each of the electrode portions 21b and 21b is further preferably from 15 to 65°, and especially preferably from 30 to 60°. The center angle α and an angle θ of 0.5 time the center angle α are angles defined in the same manner as in the center angle α and the angle θ shown in FIG. 10.

When the honeycomb structure of the present embodiment includes the above-mentioned pair of electrode portions, a voltage to be applied to the electrode portions preferably from 12 to 900 V, and further preferably from 64 to 600 V. The above pair of electrode portions include portions of the outer peripheral wall which also serve as the electrode portions.

(1-1) Constitution of Honeycomb Structure Portion:

In the honeycomb structure of the present embodiment, a material of the partition walls and the outer peripheral wall constituting the honeycomb structure portion preferably contains a silicon-silicon carbide composite material or a silicon carbide material as a main component. The above material of the partition walls and the outer peripheral wall is further preferably the silicon-silicon carbide composite material or the silicon carbide material. When "the material of the partition walls and the outer peripheral wall contains the silicon-silicon carbide composite material or the silicon carbide material as the main component", it is meant that the partition walls and the outer peripheral wall contain 90 mass % or more of the silicon-silicon carbide composite material or the silicon carbide material in the whole material.

When the partition walls and the outer peripheral wall constituting the honeycomb structure portion are made of the above-mentioned material, the electrical resistivity of the partition walls and the outer peripheral wall can be from 1 to 200 Ωcm. Here, the silicon-silicon carbide composite material contains silicon carbide particles as aggregates, and silicon as a binding agent to bind the silicon carbide particles. The plurality of silicon carbide particles are preferably bound by silicon so as to form pores among the silicon carbide particles. Moreover, the silicon carbide material is obtained by mutually sintering the silicon carbide particles. The electrical resistive of the honeycomb structure portion is a value at 400° C.

In the honeycomb structure of the present embodiment, at least a part of the outer peripheral wall is formed by "the low Young's modulus portion" configured to have the Young's modulus lower than that of the partition walls. Such a low Young's modulus portion can be formed, for example, by controlling the porosity of the outer peripheral wall, when the outer peripheral wall is formed by using the above-mentioned material. Specifically, the porosity of at least a part of the outer peripheral wall is set to be larger than that of the partition walls, so that the low Young's modulus portion can be formed in this part of the outer peripheral wall.

Specifically, when the Young's modulus is controlled in accordance with the porosity, an amount of a pore former to be included in a forming raw material is preferably regulated to increase the porosity of the outer peripheral wall.

There will be described an example of values for each of the porosity and the Young's modulus in a case where the outer peripheral wall, i.e., the low Young's modulus portion is formed by the silicon-silicon carbide composite material. In the following example, the values also vary in accordance with a ratio of each component such as silicon carbide, and hence the present invention is not limited to this example. When the porosity was 40%, the Young's modulus was 22 GPa. When the porosity was 50%, the Young's modulus was 12 GPa. When the porosity was 60%, the Young's modulus was 5 GPa. When the porosity was 70%, the Young's modulus was 2 GPa.

Moreover, there will be described another example of the values for each of the porosity and the Young's modulus in a case where the outer peripheral wall, i.e., the low Young's modulus portion is formed by using a coating material. In the following example, the values also vary in accordance with the coating material, and hence the present invention is not limited to this example. When the porosity was 50%, the Young's modulus was 3 GPa. When the porosity was 60%, the Young's modulus was 1 GPa. An example of the coating material is a material including inorganic fiber, colloidal silica, the silicon carbide particles and the like.

(1-1A) Partition Walls:

The honeycomb structure portion has porous partition walls with which a plurality of cells extending from one end surface to the other end surface are formed to become through channels of a fluid. The porous partition walls also function as a catalyst carrier which loads an exhaust gas purifying catalyst. That is, when the exhaust gas is allowed to flow through the above cells, the exhaust gas can be purified by an action of the catalyst. Moreover, the electrical resistivity of the partition walls is from 1 to 200 Ωcm. Therefore, by applying a voltage to the partition walls, this partition wall part can generate heat to function as a heater.

In the honeycomb structure of the present embodiment, there is not any special restriction on the Young's modulus of the partition walls, but the Young's modulus is preferably from 20 to 45 GPa, further preferably from 20 to 40 GPa, and especially preferably from 20 to 35 GPa. When the Young's modulus of the partition walls is lower than 20 GPa, the strength of the honeycomb structure deteriorates sometimes. When the Young's modulus of the partition walls is in excess of 45 GPa, the porosity excessively decreases, so that deformation of the partition walls at firing noticeably enlarges sometimes.

Moreover, the porosity of the partition walls is preferably from 30 to 60%, and further preferably from 30 to 50%. When the porosity is smaller than 30%, the deformation at the firing noticeably enlarges sometimes. When the porosity is in excess of 60%, the strength of the honeycomb structure deteriorates sometimes. The porosity is a value measured by a mercury porosimeter.

An average pore diameter of the partition walls of the honeycomb structure portion is preferably from 2 to 15 µm, and further preferably from 4 to 8 µm. When the average pore diameter is smaller than 2 µm, the electrical resistivity excessively increases sometimes. When the average pore diameter is larger than 15 µm, the electrical resistivity excessively decreases sometimes. The average pore diameter is a value measured by the mercury porosimeter.

In the honeycomb structure of the present embodiment, a partition walls thickness is preferably from 50 to 260 µm, and further preferably from 70 to 180 µm. In such a range of the partition walls thickness, a pressure loss at flowing of the exhaust gas can be prevented from being excessively increased even in a case where the honeycomb structure is used as the catalyst carrier which loads the catalyst on the partition walls of the honeycomb structure. When the partition walls thickness is smaller than 50 µm, the strength of the honeycomb structure deteriorates sometimes. When the partition walls thickness is larger than 260 µm, the pressure loss at the flowing of the exhaust gas increases sometimes in the case where the honeycomb structure is used as the catalyst carrier which loads the catalyst.

In the honeycomb structure of the present embodiment, a cell density is preferably from 40 to 150 cells/cm$^2$, and further preferably from 70 to 100 cells/cm$^2$. In such a range of the cell density, a purification performance of the catalyst can be enhanced in a state where the pressure loss at the flowing of the exhaust gas is decreased. When the cell density is smaller than 40 cells/cm$^2$, a catalyst loading area decreases sometimes. When the cell density is larger than 150 cells/cm$^2$, the pressure loss at the flowing of the exhaust gas increases sometimes in the case where the honeycomb structure is used as the catalyst carrier which loads the catalyst.

In the honeycomb structure of the present embodiment, an average particle diameter of the silicon carbide particles constituting the partition walls of the honeycomb structure portion is preferably from 3 to 50 µm, and further preferably from 3 to 40 µm. The above silicon carbide particles are the aggregates to form the partition walls. In such a range of the average particle diameter of the silicon carbide particles constituting the partition walls of the honeycomb structure portion, the electrical resistivity of the partition walls at 400° C. can be from 10 to 200 Ωcm. When the average particle diameter of the silicon carbide particles is smaller than 3 µm, the electrical resistivity of the honeycomb structure portion increases sometimes. When the average particle diameter of the silicon carbide particles is larger than 50 µm, the electrical resistivity of the honeycomb structure portion decreases sometimes. Furthermore, when the average particle diameter of the silicon carbide particles is larger than 50 µm, an extrusion forming die is clogged with the forming raw material sometimes at the extrusion forming of a formed honeycomb body. The average particle diameter of the silicon carbide particles is a value measured by a laser diffraction method.

In the honeycomb structure of the present embodiment, the electrical resistivity of the partition walls of the honeycomb structure portion is from 1 to 200 Ωcm. The electrical resistivity of the partition walls is preferably from 40 to 100 Ωcm. When the electrical resistivity is smaller than 1 Ωcm, the current excessively flows sometimes, for example, in a case where the honeycomb structure is energized by a power source of a high voltage of 200 V or more. When the electrical resistivity is larger than 200 Ωcm, the current does not easily flow and the heat is not sufficiently generated sometimes, for example, in the case where the honeycomb structure is energized by the power source of the high voltage of 200 V or more. It is to be noted that the above voltage in the high-voltage power source is not limited to 200 V. The electrical resistivity of the partition walls is a value measured by a four-terminal method. The electrical resistivity of the partition walls is a value at 400° C.

In the honeycomb structure of the present embodiment, when the material of the partition walls of the honeycomb structure portion is the silicon-silicon carbide composite material, "a mass of the silicon carbide particles" and "a mass of silicon" are preferably in the following relation. That is, a ratio of "the mass of silicon" to a total of "the mass of the silicon carbide particles" and "the mass of silicon" is preferably from 10 to 40 mass %, and further preferably from 15 to 35 mass %. Hereinafter, the ratio of the mass of silicon to the total of the mass of the silicon carbide particles and the mass of silicon will be called "the mass ratio of silicon" sometimes. When the mass ratio of silicon is smaller than 10 mass %, the strength of the honeycomb structure deteriorates sometimes. When the mass ratio of silicon is larger than 40 mass %, the shape cannot be retained sometimes at the firing. The above "mass of the silicon carbide particles" is "the mass of the silicon carbide particles as the aggregates" contained in the partition walls. The above "mass of silicon" is "the mass of silicon as the binding agent" contained in the partition walls.

A cell shape in the cross section of the honeycomb structure of the present embodiment which is perpendicular to the cell extending direction is preferably a quadrangular shape, a hexagonal shape, an octagonal shape, or a combination of these shapes. With such a cell shape, the pressure loss at the flowing of the exhaust gas through the honeycomb structure decreases, to enhance a purification performance of the catalyst. For example, honeycomb structures 700A and 700B shown in FIG. 19 and FIG. 20 are examples where cells 2 in a cross section perpendicular to an extending direction of the cells 2 have a hexagonal shape.

Figure 19:
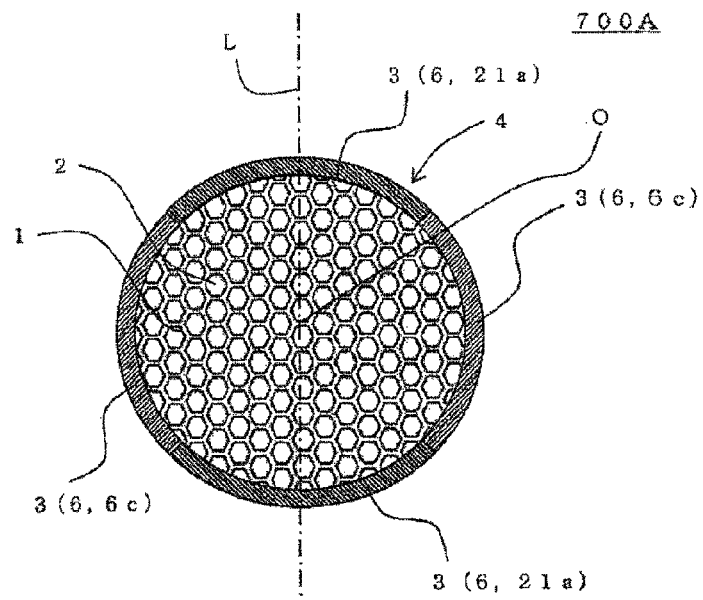
FIG. 19 is a schematic view showing a cross section of a yet another embodiment of the honeycomb structure of the present invention, which is parallel to a cell extending direction.
Figure 20:
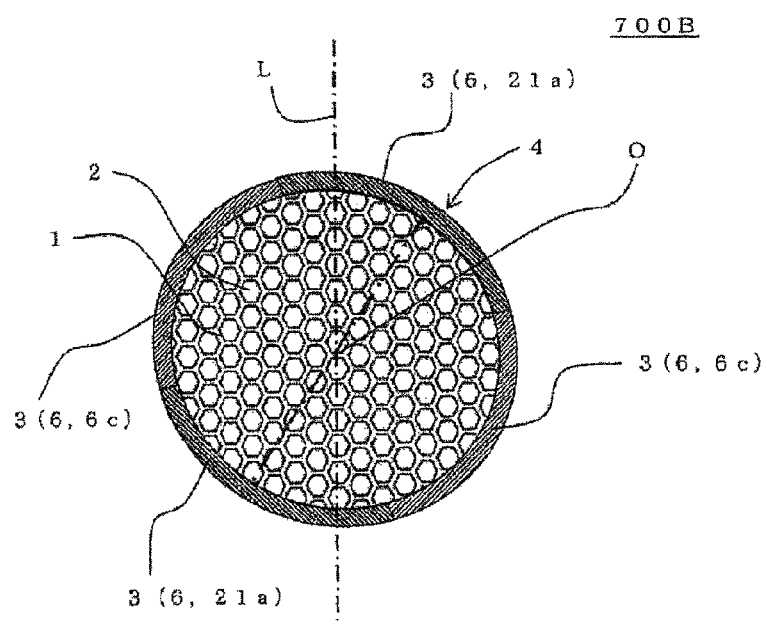
FIG. 20 is a schematic view showing a cross section of a yet another embodiment of the honeycomb structure of the present invention, which is parallel to a cell extending direction.

In the honeycomb structures 700A and 700B shown in FIG. 19 and FIG. 20, all of an outer peripheral wall 3 is formed by a low Young's modulus portion 6. Moreover, a part of the outer peripheral wall 3 is configured to have an electrical resistivity smaller than that of the other region of the outer peripheral wall 3. The above part of the outer peripheral wall 3 is provided with a pair of electrode portions 21a and 21a. Moreover, the other region of the outer peripheral wall 3 is provided with low Young's modulus portions 6c and 6c of a material having a low Young's modulus and having electric insulating properties.

In the honeycomb structures 700A and 700B, a plurality of regular hexagonal cells 2 are most densely arranged so that respective sides of the cells 2 face one another via partition walls 1. Moreover, the one electrode portion 21a in the pair of electrode portions 21a and 21a is disposed on a side opposite to the other electrode portion 21a in the pair of electrode portions 21a and 21a via a center O of a honeycomb structure portion 4. FIG. 19 and FIG. 20 are schematic views each showing a cross section of a yet another embodiment of the honeycomb structure of the present invention which is parallel to a cell extending direction.

Here, the arrangement of the electrode portions 21a in each of the honeycomb structures 700A and 700B will be described. In the cross section perpendicular to the extending direction of the cells 2, a direction perpendicular to sides of a pair of regular hexagonal cells 2 which face each other is "an axis L of the cross section perpendicular to the extending direction of the cells 2". In the honeycomb structure 700A, the electrode portions 21a are disposed so that an angle formed between "a straight line connecting an intermediate point of each of the electrode portions 21a and 21a in a peripheral direction to the center O of the honeycomb structure portion 4" and "the axis L" is 0°. It is to be noted that when the pair of sides to determine the axis L change to the other pair of sides, the above formed angle is 60° or 120°. On the other hand, in the honeycomb structure 700B, the electrode portion 21a is disposed so that an angle formed between "a straight line connecting an intermediate point of each of the electrode portions 21a and 21a in a peripheral direction to the center O of the honeycomb structure portion 4" and "the axis L" is 30°. It is to be noted that when the pair of sides to determine the axis L change to the other pair of sides, the above formed angle is 90° or 150°.

There is not any special restriction on the thickness of the outer peripheral wall constituting the outermost periphery of the honeycomb structure portion. For example, the thickness of the outer peripheral wall is preferably from 0.1 to 1 mm, further preferably from 0.2 to 0.8 mm, and especially preferably from 0.2 to 0.5 mm. When the thickness of the outer peripheral wall is smaller than 0.1 mm, the strength of the honeycomb structure deteriorates sometimes. When the thickness of the outer peripheral wall is larger than 1 mm, an area of the partition walls onto which the catalyst is loaded decreases sometimes.

The low Young's modulus portion to form the outer peripheral wall can be prepared by applying the coating material or the like to the outer peripheral portions of the partition walls as described above. As the coating material, it is possible to use the material which is dried and fired to have the Young's modulus lower than that of the partition walls.

The outer peripheral wall may be made of the same material as that of the partition walls, or a material different from that of the partition walls. For example, in the case of the same material, the low Young's modulus portion can be formed by increasing the porosity of the outer peripheral wall. That is, the low Young's modulus portion can be formed by the outer peripheral wall in which a ratio of the Young's modulus of the outer peripheral wall to the Young's modulus of the partition walls is from 2 to 95%. On the other hand, in the case of the different material, a material having a Young's modulus lower than that of the partition walls is selected, so that the low Young's modulus portion can be formed by the material. Even when the material of the partition walls is different from the material of the outer peripheral wall, the Young's modulus can further be regulated in accordance with the porosity or the like.

When the outer peripheral wall is formed by the low Young's modulus portion and the high Young's modulus portion, the high Young's modulus portion is preferably made of the same material as that of the partition walls. In particular, the high Young's modulus portion is preferably formed by leaving a part of the outer peripheral wall made of the same material as the partition walls without grinding the part. That is, first, the honeycomb structure portion having a wall in the outer peripheral portions of the partition walls is once prepared. The above "wall" is the outer peripheral wall formed integrally with the partition walls. Next, to form the low Young's modulus portion, a part of the wall formed integrally with the partition walls is ground. In this case, a part of the wall formed integrally with the partition walls is not ground but is left, and this remaining wall is the high Young's modulus portion. Such a high Young's modulus portion has the same physical properties as those of the partition walls of the honeycomb structure portion.

When the low Young's modulus portion is the same material as that of the partition walls, the low Young's modulus portion preferably contains the silicon-silicon carbide composite material or the silicon carbide material as a main component. Moreover, when the low Young's modulus portion is the material different from that of the partition walls, for example, a material including inorganic fiber, colloidal silica, silicon carbide particles and the like can be used. Such a material is used as an outer periphery coating material of a conventional honeycomb structure, or the like.

Next, there will be described a preferable range of the average particle diameter of the silicon carbide particles (i.e., the aggregates) constituting the low Young's modulus portion in a case where the material of the low Young's modulus portion of the honeycomb structure portion is the silicon-silicon carbide composite material. The average particle diameter of the silicon carbide particles constituting the low Young's modulus portion is preferably from 3 to 70 μm, and further preferably from 10 to 50 μm. In such a range of the average particle diameter of the silicon carbide particles constituting the low Young's modulus portion, the electrical resistivity of the low Young's modulus portion at 400° C. can be from 10 to 200 Ωcm. When the average particle diameter of the silicon carbide particles is smaller than 3 μm, the electrical resistivity of the low Young's modulus portion increases sometimes. When the average particle diameter of the silicon carbide particles is larger than 70 μm, the electrical resistivity of the low Young's modulus portion decreases sometimes. The average particle diameter of the silicon carbide particles is a value measured by the laser diffraction method.

Next, there will be described a preferable range of a ratio of "the mass of silicon" contained in the low Young's modulus portion to a total of "the mass of the silicon carbide particles" contained in the low Young's modulus portion and "the mass of silicon" contained in the low Young's modulus portion in a case where the material of the low Young's modulus portion is the silicon-silicon carbide composite material. The silicon carbide particles are aggregates. Silicon is a binding agent. The above ratio is preferably from 20 to 50 mass %, and further preferably from 20 to 40 mass %. When the above ratio is smaller than 20 mass %, the strength of the low Young's modulus portion deteriorates sometimes. When the above ratio is larger than 50 mass %, the shape cannot be retained sometimes at the firing.

When the low Young's modulus portion constituting the outer peripheral wall is the same material as that of the partition walls, the Young's modulus of this low Young's modulus portion is preferably from 0.8 to 30 GPa, further preferably from 1.0 to 27 GPa, and especially preferably from 1.5 to 25 GPa. An example of the low Young's modulus portion of the same material as that of the partition walls is a portion containing the silicon-silicon carbide composite material or the silicon carbide material as the main component. When the Young's modulus of the low Young's modulus portion is lower than 0.8 GPa, generation of cracks due to the heat stress can be suppressed, but the strength of the honeycomb structure deteriorates sometimes. On the other hand, when the Young's modulus of the low Young's modulus portion is in excess of 30 GPa, the low Young's modulus portion cannot sufficiently buffer the heat stress, which causes damages such as cracks sometimes.

Moreover, when the low Young's modulus portion constituting the outer peripheral wall is the same material as that of the partition walls, the porosity of the low Young's modulus portion is preferably larger than the porosity of the partition walls. Specifically, the porosity of the low Young's modulus portion is preferably from 30 to 82%, further preferably from 35 to 70%, and especially preferably from 40 to 65%. When the porosity of the low Young's modulus portion is smaller than 30%, the deformation at the firing enlarges sometimes. When the porosity of the low Young's modulus portion is in excess of 82%, the strength of the outer peripheral wall deteriorates sometimes. The porosity is a value measured by the mercury porosimeter.

Furthermore, when the low Young's modulus portion constituting the outer peripheral wall is the material different from that of the partition walls, the Young's modulus of this low Young's modulus portion is preferably from 0.5 to 10 GPa, further preferably from 0.5 to 7 GPa, and especially preferably from 1 to 5 GPa. When the Young's modulus of the low Young's modulus portion is, for example, lower than 0.5 GPa, the generation of the cracks due to the heat stress can be suppressed, but the strength of the honeycomb structure deteriorates sometimes. On the other hand, when the Young's modulus of the low Young's modulus portion is in excess of 10 GPa, the low Young's modulus portion cannot sufficiently buffer the heat stress, which causes damages such as the cracks sometimes.

Additionally, when the low Young's modulus portion constituting the outer peripheral wall is the material different from that of the partition walls, the porosity of the low Young's modulus portion is preferably from 30 to 80%, further preferably from 35 to 70%, and especially preferably from 40 to 70%. When the porosity of the low Young's modulus portion is smaller than 30%, the deformation at the firing enlarges sometimes. When the porosity of the low Young's modulus portion is in excess of 80%, the strength of the outer peripheral wall deteriorates sometimes. The porosity is a value measured by the mercury porosimeter.

There is not any special restriction on a shape of the honeycomb structure of the present embodiment. Examples of the shape of the honeycomb structure include a tubular shape with a circular bottom surface (a cylindrical shape), a tubular shape with an oval bottom surface, and a tubular shape with a polygonal bottom surface. Examples of the polygonal shape include a quadrangular shape, a pentangular shape, a hexagonal shape, a heptagonal shape, and an octagonal shape. Moreover, as to a size of the honeycomb structure, an area of the bottom surface is preferably from 2000 to 20000 $mm^2$, and further preferably from 4000 to 10000 $mm^2$. Furthermore, a length of the honeycomb structure in a central axis direction is preferably from 50 to 200 mm, and further preferably from 75 to 150 mm.

An isostatic strength of the honeycomb structure of the present embodiment is preferably 1 MPa or more, and further preferably 3 MPa or more. The isostatic strength preferably has a larger value. However, when a material, a constitution and the like of the honeycomb structure are taken into consideration, an upper limit value of the isostatic strength is about 6 MPa. When the isostatic strength is smaller than 1 MPa, the honeycomb structure is easily damaged sometimes during use of the honeycomb structure as the catalyst carrier or the like. The isostatic strength is a value measured under a hydrostatic pressure in water.

Moreover, when the honeycomb structure further includes a pair of electrode portions as described above, a part of the outer peripheral wall may be made of a material having a resistance higher than that of each of the electrode portions. In particular, a part of the outer peripheral wall which is not provided with the pair of electrode portions is made of a high-resistance material, thereby producing the following effect. When the voltage is applied between the pair of electrode portions, the current does not flow through the outer peripheral wall, but flows through the partition walls having a comparatively low resistance. In consequence, the honeycomb structure portion can suitably be heated.

In the low Young's modulus portion, the electrical resistivity can change in a part provided with the electrode portions and a part which is not provided with the electrode portions. For example, the part provided with the electrode portions preferably has about the same electrical resistivity as that of the partition walls. For example, the electrical resistivity of the part provided with the electrode portions is preferably from 0.1 to 100 Ωcm, and further preferably from 0.1 to 50 Ωcm. When the electrical resistivity is smaller than 0.1 Ωcm, the current excessively flows sometimes, for example, at the energization of the honeycomb structure by the power source of a high voltage of 200 V or more. When the electrical resistivity is larger than 100 Ωcm, the current does not easily flow, and the heat cannot sufficiently be generated sometimes, for example, at the energization of the honeycomb structure by the power source of the high voltage of 200 V or more. The voltage in the above high-voltage power source is not limited to 200 V. The electrical resistivity of the outer peripheral wall, i.e., the low Young's modulus portion is a value measured by the four-terminal method. The electrical resistivity of the outer peripheral wall is a value at 400° C.

When a part of the outer peripheral wall is made of a high-resistance material, the electrical resistivity is preferably 10 times or more, and further preferably 20 times or more of the electrical resistivity of each of the electrode portions. There is not any special restriction on an upper limit of the electrical resistivity. For example, a part of the outer peripheral wall may be formed by an insulator.

(1-2) Constitution of Electrode Portions:

Moreover, when the honeycomb structure includes a pair of electrode portions, the Young's modulus of the electrode portions is preferably from 0.9 to 30 GPa, further preferably from 1.0 to 27 GPa, and especially preferably from 1.5 to 25 GPa. The electrode portion of such a Young's modulus has a lower Young's modulus as compared with the partition walls. Therefore, the honeycomb structure has a more excellent heat shock resistance. When the Young's modulus of the electrode portion is lower than 0.9 GPa, the strength of the electrode portion deteriorates sometimes. On the other hand, when the Young's modulus of the electrode portion is in excess of 30 GPa, damages such as cracks are generated in a portion between the electrode portion and the outer peripheral wall sometimes.

The Young's modulus of each of the electrode portions is a value measured by a bending resonance method in conformity to JIS R1602. As a test piece for use in the measurement, there is used a test piece obtained by preparing a bulk body using a raw material which forms the electrode portion, and cutting this bulk body into a size of 3 mm×4 mm×40 mm. When it is difficult to measure the Young's modulus by the bending resonance method, a four-point bending method can be used as an alternative method.

The porosity of the electrode portions is preferably from 30 to 80%, further preferably from 35 to 70%, and especially preferably from 40 to 65%. In such a range of the porosity of the electrode portion, a suitable electrical resistivity can be obtained. When the porosity of the electrode portion is smaller than 30%, the electrode portion is deformed sometimes at manufacturing. When the porosity of the electrode portion is larger than 80%, the electrical resistivity excessively increases sometimes. The porosity is a value measured by the mercury porosimeter.

The electrical resistivity of the electrode portion 21 shown in FIG. 8 and FIG. 9 is preferably from 0.1 to 100 Ωcm, and further preferably 0.1 to 50 Ωcm. In such a range of the electrical resistivity of the electrode portion 21, the pair of electrode portions 21 and 21 effectively perform functions of electrodes in a piping line through which a high-temperature exhaust gas flows. When the electrical resistivity of the electrode portion 21 is smaller than 0.1 Ωcm, a temperature of the honeycomb structure portion easily rises sometimes in the vicinities of both ends of the electrode portion 21 in the cross section perpendicular to the cell extending direction. When the electrical resistivity of the electrode portion 21 is larger than 100 Ωcm, the current does not easily flow through the electrode portion 21, and the electrode portion does not easily perform the function of the electrode sometimes. The electrical resistivity of the electrode portion is a value at 400° C.

Moreover, in the honeycomb structure of the present embodiment, a thickness of the electrode portion 21 is preferably from 0.01 to 5 mm, and further preferably from 0.01 to 3 mm. In such a range, the heat can be generated evenly in the honeycomb structure. When the thickness of the electrode portion 21 is smaller than 0.01 mm, an electrical resistance increases, and the heat cannot be generated evenly in the honeycomb structure sometimes. When the thickness of the electrode portion 21 is larger than 5 mm, the electrode portion is damaged sometimes at canning. The above-mentioned thickness of the electrode portion is a value in a case where the electrode portions are disposed separately from the outer peripheral wall. For example, when a part of the outer peripheral wall is the electrode portion, a preferable configuration of the thickness of the electrode portion 21a shown in FIG. 11 and FIG. 12 is as follows. In the above-mentioned case, the thickness of the outer peripheral wall 3 does not necessarily have to be the same as that of the electrode portion 21a. That is, for the sake of the thickness required for the function of the electrode, the thickness of the outer peripheral wall 3 may be the same as that of the electrode portion 21a, or different from that of the electrode portion. However, from the viewpoints of the suppression of the cracks, casing and the like, the thickness of the outer peripheral wall 3 is preferably the same as that of the electrode portion 21a.

When the electrode portions are porous bodies, the average pore diameter of the electrode portions is preferably from 5 to 45 μm, and further preferably from 7 to 40 μm. In such a range of the average pore diameter of the electrode portions, a suitable electrical resistivity can be obtained. When the average pore diameter of the electrode portions is smaller than 5 μm, the electrical resistivity excessively increases sometimes. When the average pore diameter of the electrode portions is larger than 45 μm, the electrode portions have a deteriorated strength and are easily damaged sometimes. The average pore diameter is a value measured by the mercury porosimeter.

In the honeycomb structure of the present embodiment, as shown in, for example, FIG. 8 and FIG. 9, the electrode portion 21 has a shape obtained by curving a flat surface-like rectangular member along an outer periphery of a cylindrical shape. Here, the shape at a time when the curved electrode portion 21 is deformed into a flat surface-like member which is not curved is called "a planar shape" of the electrode portion 21. The above-mentioned "planar shape" of the electrode portion 21 shown in FIG. 8 and FIG. 9 is a rectangular shape. Moreover, "an outer peripheral shape of the electrode portion" means "the outer peripheral shape in the planar shape of the electrode portion".

Figure 15:
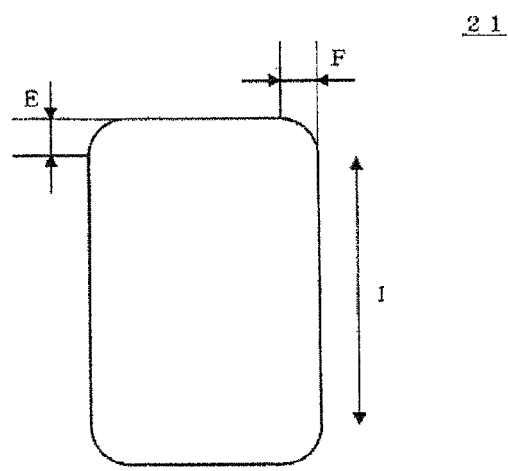
Figure 16:
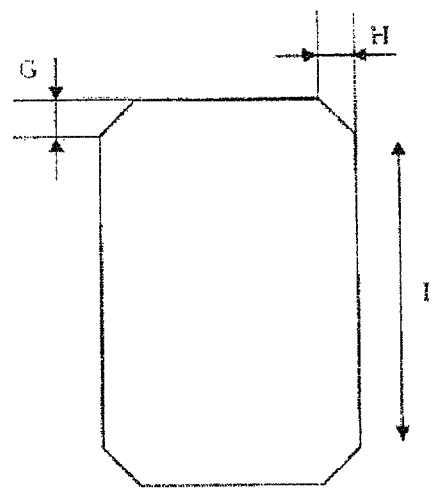
FIG. 16 is a plan view schematically showing an electrode portion.

In the honeycomb structure of the present embodiment, as shown in FIG. 8 and FIG. 9, the outer peripheral shape of the band-like electrode portion 21 may be the rectangular shape. In a preferable configuration, as shown in FIG. 15, the outer peripheral shape of the band-like electrode portion 21 is a rectangular shape including curved corner portions. Moreover, in another preferable configuration, as shown in FIG. 16, the outer peripheral shape of the band-like electrode portion 21 is a rectangular shape including linearly chamfered corner portions. The curving and chamfering may be used in a complex manner.

The outer peripheral shape of the electrode portion 21 shown in FIG. 15 is the rectangular shape including four curved corner portions. In the outer peripheral shape of the electrode portion 21, at least a corner portion may have a curved shape. The outer peripheral shape of the electrode portion 21 is the rectangular shape including at least a curved corner portion, and hence the heat shock resistance of the honeycomb structure can further be enhanced. When the corner portion of the electrode portion is formed at right angles, a stress in the vicinity of "the corner portion of the electrode portion" in the honeycomb structure portion tends to be relatively higher than that of the other portion. In consequence, when the corner portion of the electrode portion is curved, it is possible to further decrease the stress in the vicinity of "the corner portion of the electrode portion" in the honeycomb structure portion.

As shown in FIG. 15, the curved corner portion preferably has a circular shape, but may have a curved line other than the circular shape. Moreover, the curved corner portion is preferably smoothly connected to a portion corresponding to "a side" of the rectangular shape. In other words, a connecting portion between the above corner portion and the portion corresponding to "the side" of the rectangular shape preferably has respective common tangent lines. Moreover, a region connecting the above corner portion to the portion corresponding to "the side" of the rectangular shape may form a pointed connecting portion as in a vertex. When the pointed connecting portion is formed, an inner angle of the connecting portion is preferably 90° or more. It is to be noted that the connecting portion is a portion where a straight line is connected to a straight line, a curved line is connected to a straight line, or a curved line is connected to a curved line. For example, in the case of the rectangular shape, the connecting portion is a corner portion connected to two sides (i.e., a vertex portion). Moreover, as shown in FIG. 15, the curved corner portion is outwardly convex, but may be inwardly convex (i.e., outwardly concave). When the curved corner portion is inwardly convex, the inner angle of the connecting portion is preferably 90° or more. When the curved line is connected to the straight line, "the inner angle" is an angle between the straight line and a tangent line of the curved line in the connecting portion.

A length of "the curved corner portion" "in a cell extending direction I" is a length E of the corner portion in a cell direction. The length E of the corner portion in the cell direction is preferably a length of 2 to 35%, and further preferably a length of 5 to 25% of the length of the electrode portion 21 "in the cell extending direction I". When the length E is shorter than 2% of the length of the electrode portion in the direction I, the effect of further enhancing the heat shock resistance of the honeycomb structure deteriorates sometimes. When the length E is longer than 35% of the length of the electrode portion in the direction I, the heat is not easily evenly generated sometimes in a case where the voltage is applied to the honeycomb structure. Moreover, a length of "the curved corner portion" "in a direction perpendicular to the cell extending direction I" is a length F of the corner portion in a vertical direction. The length F of the corner portion in the vertical direction is preferably a length of 2 to 35%, and further preferably a length of 5 to 25% of the length of the electrode portion 21 "in the direction perpendicular to the cell extending direction I". When the length F is shorter than 2% of the length of the electrode portion in the direction I, the effect of further enhancing the heat shock resistance of the honeycomb structure deteriorates sometimes. When the length F is longer than 35% of the length of the electrode portion in the direction I, the heat is not easily evenly generated sometimes in the case where the voltage is applied to the honeycomb structure.

Moreover, the outer peripheral shape of the electrode portion 21 shown in FIG. 16 is the rectangular shape including four linearly chamfered corner portions. The outer peripheral shape of the electrode portion 21 may be a shape in which at least a corner portion is linearly chamfered. A preferable configuration of the outer peripheral shape of the electrode portion 21 is the rectangular shape including four linearly chamfered corner portions. When the outer peripheral shape of the electrode portion 21 is the shape in which at least a corner portion of a rectangle is linearly chamfered, it is possible to obtain an effect similar to the effect obtained when "the outer peripheral shape of the electrode portion 21 is the shape in which at least a corner portion of the rectangle is curved". When the corner portion is curved, a higher effect can be obtained.

A length of "the linearly chamfered corner portion" "in the cell extending direction I" is a length G of the corner portion in the cell direction. The length G of the corner portion in the cell direction is preferably a length of 2 to 35%, and further preferably a length of 5 to 25% of the length of the electrode portion 21 "in the cell extending direction I". When the length G is shorter than 2% of the length of the electrode portion in the direction I, the effect of further enhancing the heat shock resistance of the honeycomb structure deteriorates sometimes. When the length G is longer than 35% of the length of the electrode portion in the direction I, the heat is not easily evenly generated sometimes in the case where the voltage is applied to the honeycomb structure. Moreover, a length of "the linearly chamfered corner portion" "in the direction perpendicular to the cell extending direction I" is a length H of the corner portion in the vertical direction. The length H of the corner portion in the vertical direction is preferably a length of 2 to 35%, and further preferably a length of 5 to 25% of the length of the electrode portion 21 "in the direction perpendicular to the cell extending direction I". When the length H is shorter than 2% of the length of the electrode portion in the direction I, the effect of further enhancing the heat shock resistance of the honeycomb structure deteriorates sometimes. When the length H is longer than 35% of the length of the electrode portion in the direction I, the heat is not easily evenly generated sometimes in the case where the voltage is applied to the honeycomb structure.

In the honeycomb structure of the present embodiment, each electrode portion preferably does not have "a corner portion having an inner angle smaller than 90°". In other words, when the outer peripheral shape of the electrode portion has corner portions, an inner angle of each of all the corner portions is preferably in excess of 90°. In consequence, when the honeycomb structure is mounted on a car and used, a large stress can be prevented from being generated in the honeycomb structure portion even at rapid heating or rapid cooling. In the electrode portion including "the corner portion having an inner angle smaller than 90°", a high stress is easily applied to the honeycomb structure portion in the vicinity of "the corner portion" of the electrode portion "which has an inner angle smaller than 90°", when a heat shock is given to the honeycomb structure.

Figure 17A:
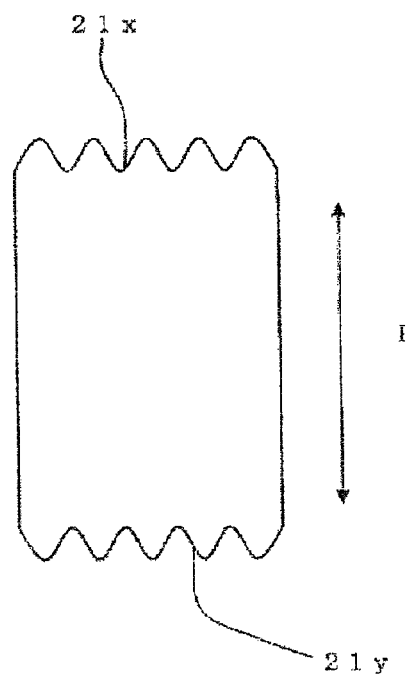
FIG. 17A is a plan view schematically showing an electrode portion.
Figure 17B:
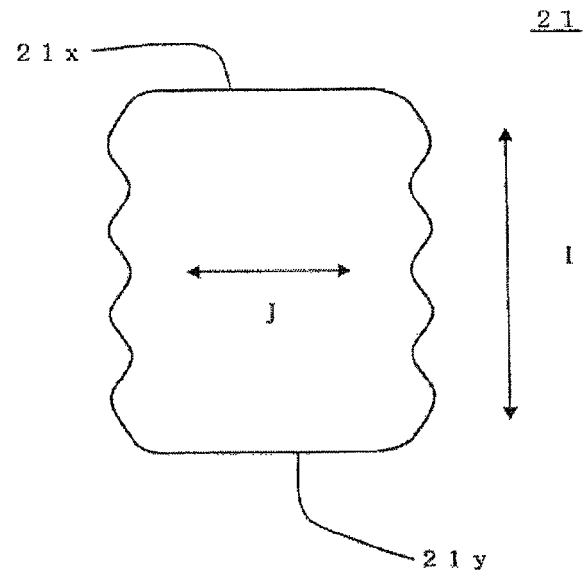
FIG. 17B is a plan view schematically showing an electrode portion.

Moreover, in the honeycomb structure of the present embodiment, it is also a preferable configuration that a shape of at least one end of the band-like electrode portion in the cell extending direction of the honeycomb structure portion is constituted of a curved line such as a waved shape or a circular shape. Moreover, the curved line and a straight line are preferably used in a complex manner. FIG. 17A also shows a preferable configuration where a shape of each of both ends of the band-like electrode portion 21 in the cell extending direction I of the honeycomb structure portion is a waved shape. Both the ends of the band-like electrode portion 21 include one end 21x of the electrode portion and the other end 21y of the electrode portion. In consequence, with the result that the shape of at least one end of the band-like electrode portion is the waved shape, a large stress can be prevented from being generated in the electrode portion. Furthermore, FIG. 17B also shows a preferable configuration where a shape of each of both ends of the band-like electrode portion 21 in a peripheral direction J of the honeycomb structure portion is a waved shape. Consequently, generation of a large stress in the electrode portion can be suppressed. In a further preferable configuration, all of the outer periphery of the band-like electrode portion 21 has the waved shape. In consequence, the generation of the large stress in the electrode portion can be suppressed.

Here, FIG. 15, FIG. 16, FIG. 17A and FIG. 17B are plan views each schematically showing the electrode portion. Moreover, the configurations of the electrode portions shown in FIG. 15 and FIG. 16 and the above configurations shown in FIG. 15, FIG. 16, FIG. 17A and FIG. 17B can be used in a complex manner. Furthermore, the electrode portion may be disposed to extend along a portion between both ends of the honeycomb structure portion 4. Furthermore, the electrode portion may be disposed in an intermediate portion in the cell extending direction via a space from the end of the honeycomb structure portion 4. For example, when the electrode portion is disposed via the space from the end of the honeycomb structure portion 4, a distance from the one end of the honeycomb structure portion to the end of the electrode portion is preferably from 1 to 10% of a length of the honeycomb structure portion in the cell extending direction. The one end of the honeycomb structure portion is the one end of the honeycomb structure portion in the cell extending direction. Moreover, the above end of the electrode portion is the end of the electrode portion which faces the one end of the honeycomb structure portion in the cell extending direction. When the electrode portion is disposed via the space from the end of the honeycomb structure portion 4, the electrode portion is preferably separately disposed on the outer peripheral wall.

The electrode portion 21 preferably contains the silicon carbide particles and silicon as main components. The electrode portion 21 is further preferably made of the silicon carbide particles and silicon as raw materials, except usually contained impurities. Here, "the silicon carbide particles and silicon as the main components" means that a total mass of the silicon carbide particles and silicon is 90 mass % or more of a mass of the whole electrode portion. In consequence, with the result that the electrode portion 21 contains the silicon carbide particles and silicon as the main components, the components of the electrode portion 21 are the same as or close to the components of the honeycomb structure portion 4, and hence thermal expansion coefficients of the electrode portion 21 and the honeycomb structure portion 4 have the same value or close values. An example where the components of the electrode portion 21 are close to those of the honeycomb structure portion 4 is a case where the material of the honeycomb structure portion is silicon carbide. Moreover, the material of the electrode portion 21 is the same as or close to that of the honeycomb structure portion 4, and hence a joining strength between the electrode portion 21 and the honeycomb structure portion 4 increases. Therefore, even when a heat stress is applied to the honeycomb structure, peeling of the electrode portion 21 from the honeycomb structure portion 4 can be prevented. Moreover, even when the heat stress is applied to the honeycomb structure, a joining portion between the electrode portion 21 and the honeycomb structure portion 4 can be prevented from being damaged.

When the main components of the electrode portion 21 are the silicon carbide particles and silicon, the average particle diameter of the silicon carbide particles contained in the electrode portion 21 is preferably from 10 to 70 µm, and further preferably from 10 to 60 µm. In such a range of that the average particle diameter of the silicon carbide particles contained in the electrode portion 21, the electrical resistivity of the electrode portion 21 can be controlled in a range of 0.1 to 100 Ωcm. When the average pore diameter of the silicon carbide particles contained in the electrode portion 21 is smaller than 10 µm, the electrical resistivity of the electrode portion 21 excessively increases. When the average pore diameter of the silicon carbide particles contained in the electrode portion 21 is larger than 70 µm, the electrode portion 21 has a deteriorated strength and is easily damaged sometimes. The average particle diameter of the silicon carbide particles contained in the electrode portion 21 is a value measured by the laser diffraction method.

A ratio of a mass of silicon contained in the electrode portion 21 to "a total of respective masses of the silicon carbide particles and silicon" contained in the electrode portion 21 is preferably from 20 to 50 mass %, and further preferably from 25 to 40 mass %. In such a range of the ratio of the mass of silicon to the total of the respective masses of the silicon carbide particles and silicon contained in the electrode portion 21, the electrical resistivity of the electrode portion 21 can be controlled in a range of 0.1 to 100 Ωcm. When the ratio of the mass of silicon to the total of the respective masses of the silicon carbide particles and silicon contained in the electrode portion 21 is smaller than 20 mass %, the electrical resistivity excessively increases sometimes. When the ratio of the mass of silicon to the total of the respective masses of the silicon carbide particles and silicon contained in the electrode portion 21 is larger than 50 mass %, the electrode portion is easily deformed sometimes at the manufacturing.

In the honeycomb structure of the present embodiment, the electrical resistivity of the electrode portions is preferably smaller than the electrical resistivity of the partition walls. Furthermore, when the electrical resistivity of the electrode portion is further preferably 20% or less, and especially preferably from 1 to 10% of the electrical resistivity of the partition walls. With the result that the electrical resistivity of the electrode portion is 20% or less of the electrical resistivity of the partition walls, the electrode portion more effectively functions as the electrode.

Figure 21:
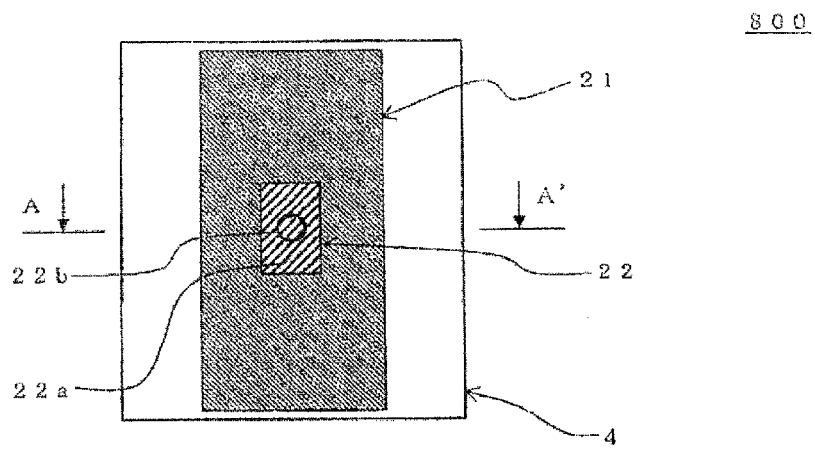
FIG. 21 is a front view schematically showing a yet another embodiment of the honeycomb structure of the present invention.
Figure 22:
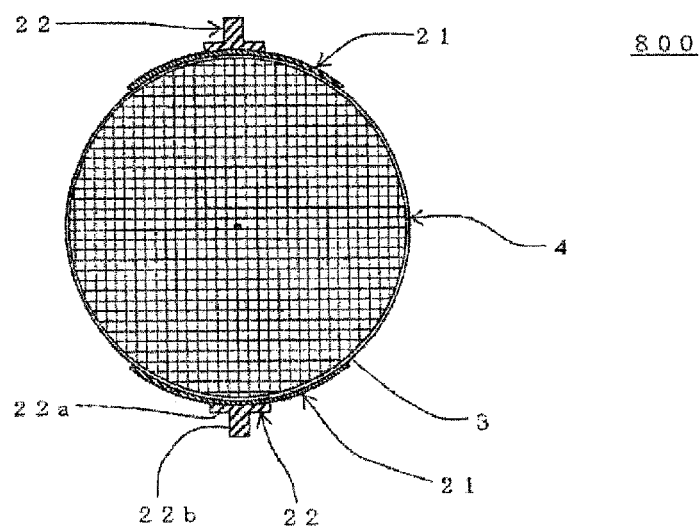
FIG. 22 is a schematic view showing the A-A' cross section in FIG. 21.
Figure 23:
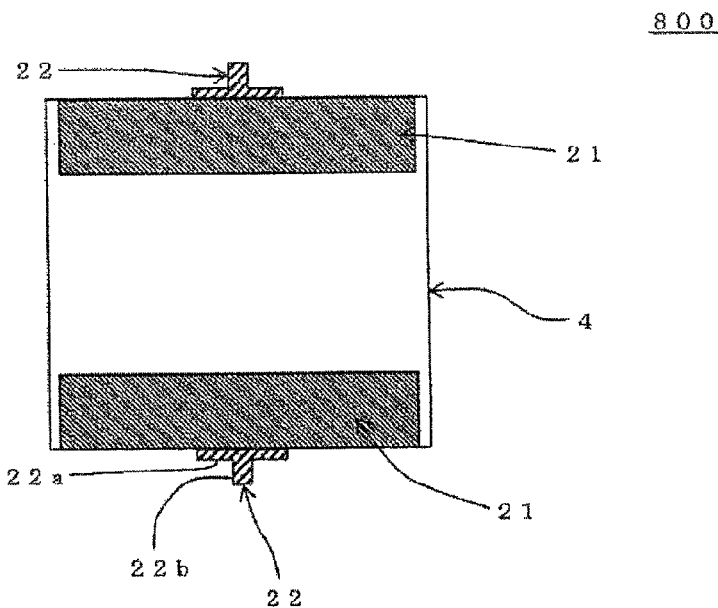
FIG. 23 is a side view schematically showing the yet another embodiment of the honeycomb structure of the present invention.

(1-3) Further Embodiment of Honeycomb Structure:

Next, a further embodiment of the honeycomb structure of the present invention will be described. As shown in FIG. 21 to FIG. 23, in a honeycomb structure 800 of the present embodiment, electrode terminal projecting portions 22 to be connected to electric wires are arranged in the honeycomb structure 400 (see FIG. 8 and FIG. 9) of the present invention. In the honeycomb structure 800, the electrode terminal projecting portions 22 are arranged in central portions of respective electrode portions 21 and 21 in a cross section perpendicular to a cell extending direction, and in central portions of the respective electrode portions in the cell extending direction. The electrode terminal projecting portions 22 are portions connected to the wires from a power source so that a voltage is applied between the electrode portions 21 and 21. In this manner, the electrode terminal projecting portions 22 are arranged, and hence when the voltage is applied between the electrode portions, a deviation of a temperature distribution of a honeycomb structure portion can further be decreased. FIG. 21 is a front view schematically showing a yet another embodiment of the honeycomb structure of the present invention. FIG. 22 is a schematic view showing the A-A' cross section in FIG. 21. FIG. 23 is a side view schematically showing the yet another embodiment of the honeycomb structure of the present invention.

Respective conditions of the honeycomb structure 800 of the present embodiment can be the same conditions as in the honeycomb structure 400 shown in FIG. 8 and FIG. 9, except the following conditions (X). The conditions (X) are that "the electrode terminal projecting portions 22 to be connected to the electric wires are arranged in the central portions (the central portions in a peripheral direction) of the respective electrode portions 21 and 21 in the cross section perpendicular to the extending direction of cells 2, and the central portions of the electrode portions in the extending direction of the cells 2". However, the honeycomb structure of the present embodiment can be applied to the honeycomb structures of the above-mentioned other embodiments, as long as the honeycomb structure is provided with the electrode terminal projecting portions 22 to be connected the electric wires. That is, the electrode terminal projecting portions 22 may be arranged in the other embodiment in which the honeycomb structure portion is provided with the pair of electrode portions, or the other embodiment in which a part of the outer peripheral wall of the honeycomb structure portion functions as the pair of electrode portions. The present embodiment can be applied to, for example, the honeycomb structure 600 shown in FIG. 13 and FIG. 14, and the honeycomb structure 500 shown in FIG. 11 and FIG. 12.

When main components of the electrode portion 21 are silicon carbide particles and silicon, main components of the electrode terminal projecting portion 22 are also preferably the silicon carbide particles and silicon. In this way, the electrode terminal projecting portion 22 contains the silicon carbide particles and silicon as the main components, and hence the components of the electrode portion 21 are the same as (or close to) the components of the electrode terminal projecting portion 22. Therefore, thermal expansion coefficients of the electrode portion 21 and the electrode terminal projecting portion 22 are the same (or close) values. Moreover, materials are the same (or close), and hence a joining strength between the electrode portion 21 and the electrode terminal projecting portion 22 increases. In consequence, even when a heat stress is applied to the honeycomb structure, the electrode terminal projecting portion 22 can be prevented from being peeled from the electrode portion 21, and a joining portion between the electrode terminal projecting portion 22 and the electrode portion 21 can be prevented from being damaged. Here, when "the electrode terminal projecting portion 22 contains the silicon carbide particles and silicon as the main components", it is meant that the electrode terminal projecting portion 22 contains 90 mass % or more of the silicon carbide particles and silicon in the whole material.

There is not any special restriction on a shape of the electrode terminal projecting portion 22. The electrode terminal projecting portion 22 may have any shape, as long as the electrode terminal projecting portion can be joined to the electrode portion 21 and the electric wire. For example, as shown in FIG. 21 to FIG. 23, the electrode terminal projecting portion 22 preferably has a shape obtained by disposing a columnar projection 22b on a quadrangular plate-like base 22a. According to such a shape, the electrode terminal projecting portion 22 can firmly be joined to the electrode portion 21 by the base 22a, and can securely be joined to the electric wire by the projection 22b.

In the electrode terminal projecting portion 22, a thickness of the base 22a is preferably from 1 to 5 mm. The electrode terminal projecting portion 22 having such a thickness can securely be joined to the electrode portion 21. When the thickness of the base 22a is smaller than 1 mm, the base 22a weakens, and the projection 22b is easily removed from the base 22a sometimes. When the thickness of the base 22a is larger than 5 mm, a space where the honeycomb structure is disposed increases more than necessary.

In the electrode terminal projecting portion 22, a length (a width) of the base 22a is preferably from 10 to 50%, and further preferably from 20 to 40% of a length of the electrode portion 21. In such a range, the electrode terminal projecting portion 22 is not easily removed from the electrode portion 21. When the length is shorter than 10%, the electrode terminal projecting portion 22 is easily removed from the electrode portion 21 sometimes. When the length is longer than 50%, a mass increases sometimes. The above "length (width) of the base 22a" is a length of the base 22a in "an outer peripheral direction in a cross section of a honeycomb structure portion 4 which is perpendicular to the cell extending direction". The above "length of the electrode portion 21" is a length of the electrode portion 21 "in the outer peripheral direction in the cross section of the honeycomb structure portion 4 which is perpendicular to the cell extending direction (the direction along the outer periphery)". In the electrode terminal projecting portion 22, the length of the base 22a in "the extending direction of the cells 2" is preferably a length corresponding to 5 to 30% of a length of the honeycomb structure portion 4 in the cell extending direction. In such a range of the length of the base 22a in "the extending direction of the cells 2", a sufficient joining strength is obtained. When the length of the base 22a in "the extending direction of the cells 2" is shorter than the length of 5% of the length of the honeycomb structure portion 4 in the cell extending direction, the base is easily removed from the electrode portion 21 sometimes. Moreover, when the length is longer than the length of 30%, the mass increases sometimes.

In the electrode terminal projecting portion 22, a thickness of the projection 22b is preferably from 3 to 15 mm. With such a thickness, the electric wire can securely be joined to the projection 22b. When the thickness of the projection 22b is smaller than 3 mm, the projection 22b is easily broken. When the thickness of the projection 22b is larger than 15 mm, the electric wire is not easily connected sometimes. Moreover, a length of the projection 22b is preferably from 3 to 20 mm. The electric wire can securely be joined to the projection 22b having such a length. When the length of the projection 22b is shorter than 3 mm, the electric wire is not easily joined to the projection sometimes. When the length of the projection 22b is longer than 20 mm, the projection 22b is easily broken sometimes.

An electrical resistivity of the electrode terminal projecting portion 22 is preferably from 0.1 to 2.0 $\Omega$cm, and further preferably from 0.1 to 1.0 $\Omega$cm. In such range of the electrical resistivity of the electrode terminal projecting portion 22, a current can efficiently be supplied from the electrode terminal projecting portion 22 to the electrode portion 21 in a piping line through which a high-temperature exhaust gas flows. When the electrical resistivity of the electrode terminal projecting portion 22 is larger than 2.0 $\Omega$cm, the current does not easily flow, and hence the current is not easily supplied to the electrode portion 21 sometimes.

A porosity of the electrode terminal projecting portion 22 is preferably from 30 to 45%, and further preferably from 30 to 40%. In such a range of the porosity of the electrode terminal projecting portion 22, a suitable electrical resistivity is obtained. When the porosity of the electrode terminal projecting portion 22 is higher than 45%, a strength of the electrode terminal projecting portion 22 deteriorates sometimes. In particular, when the strength of the projection 22b deteriorates, the projection 22b is easily broken sometimes. The porosity is a value measured by a mercury porosimeter.

An average pore diameter of the electrode terminal projecting portion 22 is preferably from 5 to 20 µm, and further preferably from 7 to 15 µm. In such a range of the average pore diameter of the electrode terminal projecting portion 22, a suitable electrical resistivity is obtained. When the average pore diameter of the electrode terminal projecting portion 22 is larger than 20 µm, the strength of the electrode terminal projecting portion 22 deteriorates sometimes. In particular, when the strength of the projection 22b deteriorates, the projection 22b is easily broken sometimes. The average pore diameter is a value measured by the mercury porosimeter.

When main components of the electrode terminal projecting portion 22 are silicon carbide particles and silicon, an average particle diameter of the silicon carbide particles contained in the electrode terminal projecting portion 22 is preferably from 10 to 60 µm, and further preferably from 20 to 60 µm. In such a range of the average particle diameter of the silicon carbide particles contained in the electrode terminal projecting portion 22, the electrical resistivity of the electrode terminal projecting portion 22 can be from 0.1 to 2.0 Ωcm. When an average pore diameter of the silicon carbide particles contained in the electrode terminal projecting portion 22 is smaller than 10 the electrical resistivity of the electrode terminal projecting portion 22 excessively increases sometimes. When the average pore diameter of the silicon carbide particles contained in the electrode terminal projecting portion 22 is larger than 60 μm, the electrical resistivity of the electrode terminal projecting portion 22 excessively decreases sometimes. The average particle diameter of the silicon carbide particles contained in the electrode terminal projecting portion 22 is a value measured by a laser diffraction method.

A ratio of a mass of silicon contained in the electrode terminal projecting portion 22 to "a total of respective masses of the silicon carbide particles and silicon" contained in the electrode terminal projecting portion 22 is preferably from 20 to 40 mass %, and further preferably from 25 to 35 mass %. In such a range of the ratio of the mass of silicon to the total of the respective masses of the silicon carbide particles and silicon contained in the electrode terminal projecting portion 22, the electrical resistivity of 0.1 to 2.0 Ωcm can easily be obtained. When the ratio of the mass of silicon to the total of the respective masses of the silicon carbide particles and silicon contained in the electrode terminal projecting portion 22 is smaller than 20 mass %, the electrical resistivity of the electrode terminal projecting portion excessively increases sometimes. Moreover, when the above ratio is larger than 40 mass %, each of the electrode terminal projecting portions is easily deformed sometimes at manufacturing.

Figure 24:
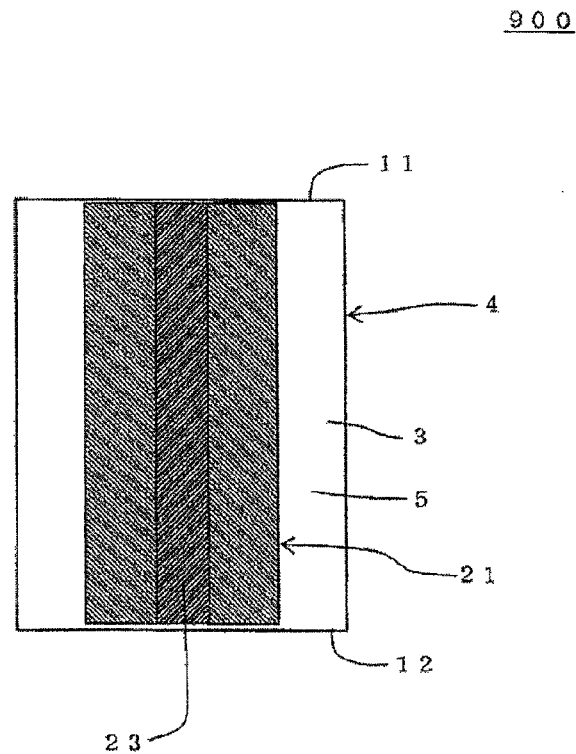
FIG. 24 is a front view schematically showing a yet another embodiment of the honeycomb structure of the present invention.

Next, a yet another embodiment of the honeycomb structure of the present invention will be described. A honeycomb structure 900 of the present embodiment is a honeycomb structure shown in FIG. 24. In the honeycomb structure 900, the surface of the electrode portion 21 of the honeycomb structure 400 shown in FIG. 8 and FIG. 9 is further provided with a conductor 23. The conductor 23 is a conductor having an electrical resistivity smaller than that of the electrode portion 21. Therefore, the honeycomb structure 900 of the present embodiment preferably has the same conditions as those of the honeycomb structure 400 of the present invention (see FIG. 8 and FIG. 9), except that the honeycomb structure has the conductor 23. FIG. 24 is a front view schematically showing a yet another embodiment of the honeycomb structure of the present invention.

Consequently, in the honeycomb structure 900 of the present embodiment, the conductor 23 having the electrical resistivity smaller than that of the electrode portion 21 is disposed on the surface of the electrode portion 21. Therefore, by applying a voltage to the conductor 23, it is possible to allow a current to more evenly flow through the whole honeycomb structure portion.

There is not any special restriction on a shape of the conductor 23, but the shape is preferably a rectangular shape extending from one end of the electrode portion to the other end of the electrode portion. The conductor 23 does not have to be disposed along a portion between both the ends of the electrode portion. That is, a space may be made between an end of the conductor 23 and the end of the electrode portion. A length of the conductor 23 is preferably 50% or more, further preferably 80% or more, and especially preferably 100% of a length of the electrode portion 21. When the length is shorter than 50%, the effect that the current is allowed to more evenly flow through the whole honeycomb structure portion when the voltage is applied deteriorates sometimes. The above "length of the conductor 23" is a length in an extending direction of "cells of the honeycomb structure portion". The above "length of the electrode portion 21" is a length in the extending direction of "the cells of the honeycomb structure portion".

Moreover, there is not any special restriction on a length of the conductor 23 in a peripheral direction, as long as the length is not more than the length of the electrode portion in the peripheral direction. The above peripheral direction is a peripheral direction in an outer periphery of the honeycomb structure portion. The length of the conductor 23 in the peripheral direction is preferably from 5 to 75%, and further preferably from 10 to 60% of the length of the electrode portion in the peripheral direction. When the length of the conductor 23 in the peripheral direction is longer than 75%, a temperature of the honeycomb structure portion easily rises in the vicinities of both ends of the electrode portion 21 sometimes, in a cross section of the honeycomb structure portion which is perpendicular to the cell extending direction. When the length of the conductor 23 in the peripheral direction is shorter than 5%, the effect that the current is allowed to more evenly flow through the whole honeycomb structure portion when the voltage is applied deteriorates sometimes.

An example of a material of the conductor 23 is a material formed by impregnating a silicon carbide structural body with silicon so as to achieve a porosity of 5% or less.

A thickness of the conductor 23 is preferably from 0.1 to 2 mm, further preferably from 0.2 to 1.5 mm, and especially preferably from 0.3 to 1 mm. When the thickness of the conductor 23 is larger than 2 mm, a heat shock resistance of the honeycomb structure deteriorates sometimes. When the thickness of the conductor 23 is smaller than 0.1 mm, a strength of the conductor 23 deteriorates sometimes.

The honeycomb structure of the present embodiment can be used as a catalyst carrier. The honeycomb structure of the present embodiment, onto which a known catalyst is loaded by a known method, can be used as a catalyst for treatment of an exhaust gas.

(2) Manufacturing Method of Honeycomb Structure:

Next, a manufacturing method of the honeycomb structure of the present invention will be described. There will be described a method of manufacturing the honeycomb structure 800 (see FIG. 21 to FIG. 23) which is a yet another embodiment of the honeycomb structure of the present invention (hereinafter referred to as "the manufacturing method (A)" sometimes).

First, metal silicon powder (metal silicon), a binder, a surfactant, a pore former, water and the like are added to silicon carbide powder (silicon carbide), to prepare a forming raw material. A mass of metal silicon to a total of a mass of the silicon carbide powder and the mass of metal silicon is preferably from 10 to 40 mass %. An average particle diameter of silicon carbide particles in the silicon carbide powder is preferably from 3 to 50 μm, and further preferably from 5 to 20 μm. An average particle diameter of metal silicon (the metal silicon powder) is preferably from 2 to 35 μm. The average particle diameters of the silicon carbide particles and metal silicon (metal silicon particles) are values measured by the laser diffraction method. The silicon carbide particles are fine particles of silicon carbide constituting the silicon carbide powder. The metal silicon particles are fine particles of metal silicon constituting the metal silicon powder. It is to be noted that this is a blend of the forming raw material when the material of the honeycomb structure portion is a silicon-silicon carbide composite material. When the material of the honeycomb structure portion is silicon carbide, metal silicon is not added.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when a total mass of the silicon carbide powder and the metal silicon powder is 100 parts by mass.

A content of the water is preferably from 20 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

There is not any special restriction on the pore former, as long as pores are formed after the firing, but examples of the pore former include graphite, starch, resin balloons, a water-absorbing resin, and silica gel. A content of the pore former is preferably from 0.5 to 10.0 parts by mass, when the total mass of the silicon carbide powder and the metal silicon powder is 100 parts by mass. An average particle diameter of the pore former is preferably from 10 to 30 μm. When the average particle diameter is smaller than 10 μm, pores cannot sufficiently be formed. When the average particle diameter is larger than 30 μm, a die is clogged sometimes at forming. The average particle diameter of the pore former is a value measured by the laser diffraction method.

Next, the forming raw material is kneaded to form a kneaded material. There is not any special restriction on a method of kneading the forming raw material to form the kneaded material, and an example of the method is a method in which a kneader, a vacuum clay kneader or the like is used.

Next, the kneaded material is extruded to obtain a formed honeycomb body. In the extrusion forming, a die having a desirable whole shape, cell shape, partition wall thickness, cell density and the like is preferably used. A material of the die is preferably a hard metal which does not easily wear down. The formed honeycomb body has a constitution having partition walls with which a plurality of cells are formed to become through channels of a fluid, and a wall positioned on an outermost periphery (an outer peripheral wall which is integral with the partition walls).

The partition wall thickness, cell density, outer peripheral wall thickness and the like of the formed honeycomb body can suitably be determined in accordance with a constitution of the honeycomb structure of the present invention which is to be prepared, in consideration of shrinkages at drying and firing.

The obtained formed honeycomb body is preferably dried. There is not any special restriction on a drying method, and examples of the method include electromagnetic heating systems such as microwave heating drying and high-frequency dielectric heating drying, and external heating systems such as hot air drying and superheat vapor drying. In these examples, it is preferable that a predetermined amount of water content is dried by the electromagnetic heating system, and then the remaining water content is dried by the external heating system. According to such a drying method, the whole formed body can immediately and evenly be dried without generating any cracks. As drying conditions, it is preferable that the water content of 30 to 99 mass % of an amount of the water content prior to the drying is removed by the electromagnetic heating system, and then the water content is decreased to 3 mass % or less by the external heating system. The electromagnetic heating system is preferably the dielectric heating drying. The external heating system is preferably the hot air drying.

When the length of the formed honeycomb body in the central axis direction is not a desirable length, both ends of the formed honeycomb body are preferably cut so that the length is the desirable length. An example of a cutting method is a method using a disc saw cutter or the like. The cutting method is not limited to the above-mentioned method.

Next, the formed honeycomb body is preferably dried, to obtain a dried honeycomb body. A drying condition is preferably from 50 to 100° C.

Next, the dried honeycomb body is preferably fired to obtain a fired honeycomb body. Moreover, prior to the firing, calcinating is preferably performed to remove the binder and the like. The calcinating is preferably performed at 400 to 500° C. in the atmosphere for 0.5 to 20 hours. There is not any special restriction on a calcinating and firing method. The calcinating and firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, an oxidation treatment is preferably performed at 1200 to 1350° C. for one to ten hours, to enhance a durability.

Next, in an outer peripheral portion of the fired honeycomb body, a portion to form a low Young's modulus portion is ground into a desirable shape. For example, when all of an outer peripheral wall is the low Young's modulus portion, all of the outer peripheral portion of the fired honeycomb body is ground. Moreover, when a part of the outer peripheral wall is the low Young's modulus portion, a part of the outer peripheral portion of the fired honeycomb body is ground. The other part where the outer peripheral portion of the fired honeycomb body is left is a high Young's modulus portion of the outer peripheral wall.

Next, a low Young's modulus portion forming raw material to form the low Young's modulus portion is prepared. When main components of the low Young's modulus portion are silicon carbide and silicon, the paste-like low Young's modulus portion forming raw material is preferably formed by using silicon carbide powder and silicon powder. Predetermined additives are preferably added to the silicon carbide powder and the silicon powder. The silicon carbide powder and silicon powder to which the additives have been added are preferably kneaded, to form the low Young's modulus portion forming raw material. The above low Young's modulus portion forming raw material is preferably fired to have a Young's modulus of 2 to 95% of the Young's modulus of the partition walls.

Specifically, metal silicon powder (metal silicon), a binder, a surfactant, a pore former, water and the like are added to the silicon carbide powder (silicon carbide), and kneaded to prepare the low Young's modulus portion forming raw material. A mass of metal silicon is preferably from 20 to 50 parts by mass, when a total mass of the silicon carbide powder and metal silicon is 100 parts by mass. An average particle diameter of silicon carbide particles in the silicon carbide powder is preferably from 3 to 70 μm. An average particle diameter of the metal silicon powder (metal silicon) is preferably from 2 to 20 μm. When the average particle diameter of the metal silicon powder is smaller than 2 μm, electrical resistivity excessively decreases sometimes.

When the average particle diameter of the metal silicon powder is larger than 20 µm, the electrical resistivity excessively increases sometimes. The average particle diameters of the silicon carbide particles and metal silicon particles are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

The pore former may be any pore former, as long as the pores are formed after the firing. There is not any special restriction on the pore former, but examples of the pore former include graphite, starch, resin balloons, a water-absorbing resin, and silica gel. A content of the pore former is preferably from 0.1 to 15.0 parts by mass, when the total mass of the silicon carbide powder and the metal silicon powder is 100 parts by mass. By increasing or decreasing the content of the pore former, the porosity of the low Young's modulus portion can be controlled. Thus, the Young's modulus of the low Young's modulus portion can be controlled. An average particle diameter of the pore former is preferably from 10 to 30 µm.

Such a low Young's modulus portion forming raw material is applied to the ground outer peripheral portion of the fired honeycomb body, to form the outer peripheral wall constituted of the low Young's modulus portion. There is not any special restriction on a method of applying the low Young's modulus portion forming raw material. An example of the method of applying the low Young's modulus portion forming raw material is a method in which the fired honeycomb body including the ground outer peripheral portion is coated by using a rubber spatula or the like, while turning the fired honeycomb body on a potter's wheel. Moreover, the fired honeycomb body including the ground outer peripheral portion has incomplete cells in this outer peripheral portion sometimes. In such a case, when the low Young's modulus portion forming raw material is applied, the low Young's modulus portion forming raw material is preferably filled into the incomplete cells. In consequence, the insides of the incomplete cells are preferably provided with the low Young's modulus portion.

Next, an electrode portion forming raw material to form the electrode portions is prepared. When the main components of the electrode portions are silicon carbide and silicon, the electrode portion forming raw material is preferably formed by adding predetermined additives to silicon carbide powder and silicon powder, followed by kneading. Specifically, metal silicon powder (metal silicon), a binder, a surfactant, a pore former, water and the like are added to the silicon carbide powder (silicon carbide), and kneaded to prepare the electrode portion forming raw material. A mass of metal silicon is preferably from 20 to 40 parts by mass, when a total mass of the silicon carbide powder and metal silicon is 100 parts by mass. An average particle diameter of silicon carbide particles in the silicon carbide powder is preferably from 10 to 60 µm. An average particle diameter of the metal silicon powder (metal silicon) is preferably from 2 to 20 µm. When the average particle diameter of the metal silicon powder is smaller than 2 µm, an electrical resistivity excessively decreases sometimes. When the average particle diameter of the metal silicon powder is larger than 20 µm, the electrical resistivity excessively increases sometimes. The average particle diameters of the silicon carbide particles and metal silicon particles are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 0.1 to 5.0 parts by mass, when the total mass of the silicon carbide powder and the metal silicon powder is 100 parts by mass.

A content of the water is preferably from 15 to 60 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

The pore former may be any pore former, as long as the pores are formed after the firing. There is not any special restriction on the pore former, but examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter of the pore former is smaller than 10 µm, the pores cannot sufficiently be formed sometimes. When the average particle diameter of the pore former is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the paste-like electrode portion forming raw material. There is not any special restriction on a kneading method, and, for example, a vertical stirrer can be used.

Next, the obtained electrode portion forming raw material is preferably applied to the side surface of the fired honeycomb body coated with the low Young's modulus portion forming raw material. There is not any special restriction on a method of applying the electrode portion forming raw material to the side surface of the fired honeycomb body coated with the low Young's modulus portion forming raw material. An example of the method of applying the electrode portion forming raw material is a printing method. Hereinafter, the fired honeycomb body coated with the low Young's modulus portion forming raw material will be called "the fired honeycomb body with the low Young's modulus portion" sometimes.

Moreover, it is also a preferable configuration that when the electrode portion forming raw material is applied to the side surface of the fired honeycomb body with the low Young's modulus portion, an outer peripheral shape of the electrode portion to be formed is the following shape. That is, the shape is a rectangular shape in which at least one corner portion is curved, or a rectangular shape in which at least one corner portion is linearly chamfered. Furthermore, it is also a preferable configuration that a shape of at least one end of the electrode portion to be formed in "a cell extending direction of a honeycomb structure portion" is a waved shape.

A thickness of the electrode portion can be set to a desirable thickness, by regulating the thickness of the electrode portion forming raw material when the material is applied. In consequence, the electrode portion can be formed simply by applying the electrode portion forming raw material to the side surface of the fired honeycomb body with the low Young's modulus portion, and carrying out the drying and firing. Therefore, the electrode portion can very easily be formed.

Next, the electrode portion forming raw material applied to the side surface of the fired honeycomb body with the low Young's modulus portion is preferably dried. In consequence, it is possible to obtain the dried "fired honeycomb body with the low Young's modulus portion to which the electrode portion forming raw material is applied". A drying condition is preferably from 50 to 100° C. Any electrode terminal projecting portion forming members are not attached to the above "fired honeycomb body with the low Young's modulus portion to which the electrode portion forming raw material is applied".

Next, the electrode terminal projecting portion forming member is preferably prepared. The electrode terminal projecting portion forming member is attached to the fired honeycomb body with the low Young's modulus portion, to form the electrode terminal projecting portion. There is not any special restriction on a shape of the electrode terminal projecting portion forming member, but a shape shown in, for example, FIG. 22 to FIG. 24 is preferably formed. Moreover, the obtained electrode terminal projecting portion forming member is preferably attached to a portion to which the electrode portion forming raw material is applied, in the fired honeycomb body with the low Young's modulus portion to which the electrode portion forming raw material is applied. It is to be noted that an order of the preparation of the fired honeycomb body with the low Young's modulus portion, the preparation of the electrode portion forming raw material and the preparation of the electrode terminal projecting portion forming member may be any order.

The electrode terminal projecting portion forming member is preferably obtained by forming and drying an electrode terminal projecting portion forming raw material. The electrode terminal projecting portion forming raw material is a raw material to form the electrode terminal projecting portion forming member. When the main components of the electrode terminal projecting portion are silicon carbide and silicon, the electrode terminal projecting portion forming raw material is preferably formed by adding predetermined additives to silicon carbide powder and silicon powder and kneading this mixture.

Specifically, metal silicon powder (metal silicon), a binder, a surfactant, a pore former, water and the like are added to the silicon carbide powder (silicon carbide), and kneaded to prepare the electrode terminal projecting portion forming raw material. A mass of metal silicon is preferably from 20 to 40 mass % of a total of a mass of the silicon carbide powder and a mass of metal silicon. An average particle diameter of silicon carbide particles in the silicon carbide powder is preferably from 10 to 60 µm. An average particle diameter of the metal silicon powder (metal silicon) is preferably from 2 to 20 µm. When the average particle diameter of the metal silicon powder is smaller than 2 µm, an electrical resistivity excessively decreases sometimes. When the average particle diameter of the metal silicon powder is larger than 20 µm, the electrical resistivity excessively increases sometimes. The average particle diameters of the silicon carbide particles and metal silicon particles are values measured by the laser diffraction method. The silicon carbide particles are fine particles of silicon carbide constituting the silicon carbide powder. The metal silicon particles are fine particles of metal silicon constituting the metal silicon powder.

Examples of the binder include methylcellulose, hydroxypropyl methylcellulose, hydroxypropoxyl cellulose, hydroxyethylcellulose, carboxymethylcellulose, and polyvinyl alcohol. Among these examples, methylcellulose and hydroxypropoxyl cellulose are preferably used together. A content of the binder is preferably from 2.0 to 10.0 parts by mass, when the total mass of the silicon carbide powder and the metal silicon powder is 100 parts by mass.

A content of the water is preferably from 20 to 40 parts by mass, when the total mass of the silicon carbide powder and the metal silicon powder is 100 parts by mass.

As the surfactant, ethylene glycol, dextrin, fatty acid soap, polyalcohol or the like can be used. One of these surfactants may be used alone, or a combination of two or more of the surfactants may be used. A content of the surfactant is preferably from 0.1 to 2.0 parts by mass, when the total mass of the silicon carbide powder and the metal silicon powder is 100 parts by mass.

The pore former may be any pore former, as long as the pores are formed after the firing. There is not any special restriction on the pore former, but examples of the pore former include graphite, starch, resin balloons, a water-absorbing resin, and silica gel. A content of the pore former is preferably from 0.1 to 5.0 parts by mass, when the total mass of the silicon carbide powder and the metal silicon powder is 100 parts by mass. An average particle diameter of the pore former is preferably from 10 to 30 µm. When the average particle diameter of the pore former is smaller than 10 µm, the pores cannot sufficiently be formed sometimes. When the average particle diameter of the pore former is larger than 30 µm, large pores are easily formed, to cause strength deterioration sometimes. The average particle diameter of the pore former is a value measured by the laser diffraction method.

Next, a mixture obtained by mixing the silicon carbide powder (silicon carbide), metal silicon (the metal silicon powder), the binder, the surfactant, the pore former, the water and the like is preferably kneaded, to obtain the electrode terminal projecting portion forming raw material. There is not any special restriction on a kneading method. An example of the method is a kneading method using a kneader.

There is not any special restriction on a method of forming the obtained electrode terminal projecting portion forming raw material, to achieve a shape of the electrode terminal projecting portion forming member. An example of the method is a method of carrying out processing after extrusion forming.

It is preferable that the electrode terminal projecting portion forming raw material is formed into the shape of the electrode terminal projecting portion forming member, and then dried to obtain the electrode terminal projecting portion forming member. A drying condition is preferably from 50 to 100° C.

Next, the electrode terminal projecting portion forming member is preferably attached to the fired honeycomb body with the low Young's modulus portion to which the electrode portion forming raw material is applied. There is not any special restriction on a method of attaching the electrode terminal projecting portion forming member to the portion to which the electrode portion forming raw material is applied, in the fired honeycomb body with the low Young's modulus portion. The electrode terminal projecting portion forming member is preferably attached to the fired honeycomb body with the low Young's modulus portion by use of, for example, the above electrode portion forming raw material. The electrode terminal projecting portion forming member is preferably attached by, for example, the following method. First, the electrode portion forming raw material is applied to the surface of the electrode terminal projecting portion forming member which is attached to the fired honeycomb body with the low Young's modulus portion. The above "attaching surface" is a contact surface between the fired honeycomb body with the low Young's modulus portion and the electrode terminal projecting portion forming member. More specifically, the surface is the surface of the fired honeycomb body with the low Young's modulus portion to which the electrode portion forming raw material is applied. Next, the electrode terminal projecting portion forming member is attached to the fired honeycomb body with the low Young's modulus portion so that "the surface to which the electrode portion forming raw material is applied" comes in contact with the fired honeycomb body with the low Young's modulus portion.

Then, "the fired honeycomb body with the low Young's modulus portion to which the electrode portion forming raw material is applied and the electrode terminal projecting portion forming member is attached" is preferably dried and fired, to obtain the honeycomb structure of the present invention. It is to be noted that when the one embodiment (the honeycomb structure 100, see FIG. 1 to FIG. 3) of the honeycomb structure of the present invention is prepared, the above electrode portion is not formed, but the fired honeycomb body with the low Young's modulus portion may be fired.

A drying condition at this time is preferably from 50 to 100° C.

Moreover, prior to the firing, calcinating is preferably performed to remove the binder and the like. The calcinating is preferably performed at 400 to 500° C. in the atmosphere for 0.5 to 20 hours. There is not any special restriction on a calcinating and firing method. The calcinating and firing can be performed by using an electric furnace, a gas furnace or the like. As firing conditions, heating is preferably performed at 1400 to 1500° C. in an inert atmosphere of nitrogen, argon or the like for one to 20 hours. Moreover, after the firing, an oxidation treatment is preferably performed at 1200 to 1350° C. for one to ten hours, to enhance a durability.

The electrode terminal projecting portion forming member may be attached before or after firing again "the fired honeycomb body with the low Young's modulus portion to which the electrode portion forming raw material is applied". When the electrode terminal projecting portion forming member is attached after firing again the fired honeycomb body with the low Young's modulus portion to which the electrode portion forming raw material is applied, the fired honeycomb body is preferably then fired again on the above conditions.

Next, a manufacturing method of the honeycomb structure 900 shown in FIG. 24 will be described. According to the manufacturing method of the honeycomb structure 900, in the above manufacturing method (A), "the fired honeycomb body with the low Young's modulus portion to which the electrode portion forming raw material is applied" is prepared, and then the electrode terminal projecting portion forming member is not attached, but the conductor 23 is disposed.

An example of a method of disposing the conductor 23 in "the fired honeycomb body with the low Young's modulus portion to which the electrode portion forming raw material is applied" is a method of attaching a thin metal plate (e.g., a metal foil) to the surface of the electrode portion. Moreover, another example of the method is a method in which a metal powder-containing paste is applied to the surface of the electrode portion, and dried. The above "fired honeycomb body with the low Young's modulus portion to which the electrode portion forming raw material is applied" is the dried fired honeycomb body with the low Young's modulus portion to which the electrode portion forming raw material is applied. That is, the electrode terminal projecting portion forming member is not attached.

EXAMPLES

Hereinafter, examples of the present invention will further specifically be described, but the present invention is not limited to these examples.

Example 1

Silicon carbide (SiC) powder and metal silicon (Si) powder were mixed at a mass ratio of 80:20. To this mixture, hydroxypropyl methylcellulose as a binder and a water-absorbing resin as a pore former were added, and water was also added, to prepare a forming raw material. Thereafter, the forming raw material was kneaded by a vacuum clay kneader, to prepare a columnar kneaded material. A content of the binder was 7 parts by mass, when a total of the silicon carbide (SiC) powder and the metal silicon (Si) powder was 100 parts by mass. A content of the pore former was 3 parts by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 μm. An average particle diameter of the metal silicon powder was 6 μm. Moreover, an average particle diameter of the pore former was 20 μm. The average particle diameters of silicon carbide, metal silicon and the pore former were values measured by a laser diffraction method.

The obtained columnar kneaded material was formed by using an extrusion forming machine, to obtain a formed honeycomb body. The obtained formed honeycomb body was subjected to high-frequency dielectric heating and drying. Thereafter, the formed honeycomb body was dried at 120° C. for two hours by use of a hot air drier, and both end surfaces of the formed honeycomb body were cut as much as predetermined amounts. Next, the dried formed honeycomb body was degreased and fired, to obtain a fired honeycomb body. Degreasing conditions were 550° C. and three hours. Firing conditions were 1450° C. and two hours in an argon atmosphere.

Next, an outer peripheral side of the fired honeycomb body was ground, except a part of an outer peripheral wall. That is, in the present example, a part of a present outer peripheral portion of the fired honeycomb body was beforehand removed. Then, low Young's modulus portions were newly prepared in a portion from which an outer periphery was removed, by use of a low Young's modulus portion forming raw material described later. As a grind processing method, a grinding method by a grindstone was used. The low Young's modulus portions had such a size that a ratio of sums of lengths of the low Young's modulus portions in a peripheral direction to a length of a honeycomb structure portion in the peripheral direction (the ratio in the peripheral direction) was 40%.

Next, a low Young's modulus portion forming raw material to form a low Young's modulus portion was prepared. First, silicon carbide (SiC) powder and metal silicon (Si) powder were mixed at a mass ratio of 80:20. To this mixture, hydroxypropyl methylcellulose as a binder and a water-absorbing resin as a pore former were added, and water was also added, to prepare a forming raw material. The obtained forming raw material was kneaded by the vacuum clay kneader, to prepare a columnar kneaded material. A content of the binder was 7 parts by mass, when a total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 20 µm. An average particle diameter of the metal silicon powder was 6 µm. Moreover, an average particle diameter of the pore former was 20 µm. The average particle diameters of silicon carbide, metal silicon and the pore former were values measured by the laser diffraction method. It is to be noted that in each example, a Young's modulus of the outer peripheral wall to be obtained (i.e., the low Young's modulus portion) is controlled by regulating a content of the pore former of the low Young's modulus portion forming raw material.

The obtained low Young's modulus portion forming raw material was applied to a portion obtained by grinding an outer peripheral portion of the fired honeycomb body, to prepare the outer peripheral wall constituted of the low Young's modulus portion. A method of applying the low Young's modulus portion forming raw material was a (coating) method in which the outer peripheral portion of the fired honeycomb body was coated with the low Young's modulus portion forming raw material in an even thickness by use of a rubber spatula, while turning the fired honeycomb body on a potter's wheel. The thickness of the low Young's modulus portion after the drying and firing was 0.35 mm.

Next, the low Young's modulus portion forming raw material applied to the fired honeycomb body was dried. A drying condition was 70° C.

Next, an electrode portion forming raw material was prepared. First, silicon carbide (SiC) powder and metal silicon (Si) powder were mixed at a mass ratio of 60:40. To this mixture, hydroxypropyl methylcellulose as a binder, glycerin as a moisture retaining agent and a surfactant as a dispersant were added, and water was also added, and mixed. This mixture was kneaded to prepare the electrode portion forming raw material. A content of the binder was 0.5 part by mass, when a total of the silicon carbide (SiC) powder and the metal silicon (Si) powder was 100 parts by mass. A content of glycerin was 10 parts by mass, when the total of the silicon carbide (SiC) powder and the metal silicon (Si) powder was 100 parts by mass. A content of the surfactant was 0.3 part by mass, when the total of the silicon carbide (SiC) powder and the metal silicon (Si) powder was 100 parts by mass. A content of the water was 42 parts by mass, when the total of the silicon carbide (SiC) powder and the metal silicon (Si) powder was 100 parts by mass. An average particle diameter of the silicon carbide powder was 52 µm. An average particle diameter of the metal silicon powder was 6 µm. The average particle diameters of silicon carbide and metal silicon were values measured by the laser diffraction method. The kneading was carried out by a vertical stirrer.

Next, the electrode portion forming raw material was applied, in a band-like state, to the side surface of the fired honeycomb body. Specifically, the electrode portion forming raw material was applied to the side surface of a portion of the fired honeycomb body in which the outer peripheral wall was left so that "0.5 time a center angle was 49° in a cross section perpendicular to a cell extending direction". The portion in which the outer peripheral wall was left was a portion which became a high Young's modulus portion. A thickness of the applied electrode portion forming raw material was regulated so that the thickness after the drying and firing was 0.25 mm. Moreover, on the side surface of the portion of the fired honeycomb body in which the outer peripheral wall was left, the electrode portion forming raw material was applied to two portions of the fired honeycomb body extending from one end surface to the other end surface. Furthermore, in the cross section perpendicular to the cell extending direction, one electrode portion forming raw material in the electrode portion forming raw materials applied to the two portions was disposed on a side opposite to the other electrode portion forming raw material via the center of the fired honeycomb body. A shape of the electrode portion forming raw material applied to the side surface of the fired honeycomb body was a rectangular shape.

Next, the electrode portion forming raw material applied to the fired honeycomb body was dried. A drying condition was 70° C.

Next, an electrode terminal projecting portion forming raw material was prepared. First, silicon carbide (SiC) powder and metal silicon (Si) powder were mixed at a mass ratio of 60:40. To this mixture, hydroxypropyl methylcellulose as a binder was added, and water was also added, and mixed. This mixture was kneaded to prepare the electrode terminal projecting portion forming raw material. The electrode terminal projecting portion forming raw material was kneaded by using a vacuum clay kneader, to prepare a kneaded material. A content of the binder was 4 parts by mass, when a total of the silicon carbide (SiC) powder and the metal silicon (Si) powder was 100 parts by mass. A content of the water was 22 parts by mass, when the total of the silicon carbide (SiC) powder and the metal silicon (Si) powder was 100 parts by mass. An average particle diameter of the silicon carbide powder was 52 µm. An average particle diameter of the metal silicon powder was 6 µm. The average particle diameters of silicon carbide and metal silicon were values measured by the laser diffraction method.

The obtained kneaded material was processed into a shape as in an electrode terminal projecting portion 22 shown in FIG. 21 to FIG. 23. The shape shown in FIG. 21 to FIG. 23 is a shape constituted of a base and a projection. The processed kneaded material was dried, to obtain an electrode terminal projecting portion forming member. Moreover, a drying condition was 70° C. A portion corresponding to a plate-like base 22a had a size of "3 mm×12 mm×15 mm". Moreover, a portion corresponding to a projection 22b was a columnar portion having a bottom surface diameter of 7 mm and a length of 10 mm in a central axis direction. Two electrode terminal projecting portion forming members were prepared.

Next, the two electrode terminal projecting portion forming members were attached to two portions of the fired honeycomb body to which the electrode portion forming raw material was applied, respectively. The electrode terminal projecting portion forming members were attached to the portions of the fired honeycomb body to which the electrode portion forming raw material was applied, by use of the electrode portion forming raw material. Afterward, "the fired honeycomb body to which the electrode portion forming raw material was applied and the electrode terminal projecting portion forming members were attached" was degreased, fired, and further subjected to an oxidation treatment to obtain a honeycomb structure. Degreasing conditions were 550° C. and three hours. Firing conditions were 1450° C. and two hours in an argon atmosphere. Conditions of the oxidation treatment were 1300° C. and one hour.

An average pore diameter of partition walls of the obtained honeycomb structure was 8.6 μm. A porosity of the partition walls of the honeycomb structure was 45%. Moreover, an average pore diameter of the low Young's modulus portion to form the outer peripheral wall was 15 μm. A porosity of the low Young's modulus portion was 82%. The average pore diameters and porosities were values measured by a mercury porosimeter (trade name: Autopore IV9505 manufactured by Micromeritics Co.).

Moreover, a Young's modulus of the partition walls was 30 GPa. A Young's modulus of the low Young's modulus portion to form the outer peripheral wall was 0.8 GPa. A Young's modulus of electrode portions was 3 GPa. Moreover, a Young's modulus of a remaining portion of the outer peripheral wall formed integrally with the partition walls was 30 GPa similarly to the partition walls. The remaining portion of this outer peripheral wall was a high Young's modulus portion. The Young's modulus of each portion was a value measured by a bending resonance method in conformity to JIS R1602. A test piece of the measurement of the Young's modulus of the partition walls had a size of 20 mm×10 mm×100 mm. As each of test pieces for Young's modulus measurements of the low Young's modulus portion and the electrode portion, a bulk body was prepared using the respective raw materials, and this bulk body having a size of 3 mm×4 mm×40 mm was used.

Furthermore, a thickness of the partition walls of the honeycomb structure was 101.6 μm. A cell density of the honeycomb structure was 93 cells/cm². Moreover, a bottom surface of the honeycomb structure had a round shape of a diameter of 93 mm. A length of the honeycomb structure in the cell extending direction was 100 mm. Furthermore, in each of two electrode portions disposed in the honeycomb structure, 0.5 time the center angle in the cross section perpendicular to the cell extending direction was 49°. Moreover, a thickness of the electrode portions was 0.25 mm. Furthermore, an electrical resistivity of the electrode portion was 0.8 Ωcm. An electrical resistivity of the partition walls constituting a honeycomb structure portion was 40 Ωcm. An electrical resistivity of the low Young's modulus portion of the outer peripheral wall was 100 Ωcm. An electrical resistivity of the electrode terminal projecting portion was 0.8 Ωcm.

Additionally, the electrical resistivities of the honeycomb structure portion, the electrode portions and the electrode terminal projecting portions were measured by the following method. A test piece of 10 mm×10 mm×50 mm was prepared by using the same material as that of an object to be measured. That is, when the electrical resistivity of the honeycomb structure portion was measured, the test piece was prepared by using the same material as that of the honeycomb structure portion. When the electrical resistivity of the electrode portion was prepared, the test piece was prepared by using the same material as that of the electrode portion. Moreover, when the electrical resistivity of the electrode terminal projecting portion was measured, the test piece was prepared by using the same material as that of the electrode terminal projecting portion. All surfaces of both ends (both the ends in a longitudinal direction) of each of the test pieces were coated with a silver paste, and provided with a wiring line, thereby enabling energization. A voltage applying current measuring device was connected to the test piece, to apply a voltage thereto. A thermocouple was disposed in the center of the test piece, and a change of a temperature of the test piece with an elapse of time when applying the voltage was confirmed by a recorder. A voltage of 100 to 200 V was applied, and a current value and a voltage value were measured in a state where the temperature of the test piece was 400° C. The electrical resistivity was calculated from the obtained current value and voltage value, and a test piece dimension.

Moreover, a percentage of a ratio of the Young's modulus (GPa) of the outer peripheral wall to the Young's modulus (GPa) of the partition walls was calculated as "a Young's modulus ratio (%)". The results are shown in Table 1.

The obtained honeycomb structure was subjected to "evaluation of a heat shock resistance" and "evaluation of an isostatic strength" by the following methods. The results are shown in Table 1.

(Evaluation of Heat Shock Resistance)

A gas burner test machine was used, to evaluate the heat shock resistance of the honeycomb structure. As the gas burner test machine, a propane gas burner test machine to burn a propane gas was used. Specifically, after canning the honeycomb structure of each example in a metal case, the canned honeycomb structure was disposed in the gas burner test machine. Heating and cooling of the honeycomb structure were carried out as much as 100 cycles on the following air flow conditions for each cycle. The air flow conditions for each cycle were that a gas of 950° C. was allowed to flow from an inlet, side of the honeycomb structure in the gas burner test machine for ten minutes, and then a gas of 100° C. was allowed to flow for ten minutes. Then, a generation state of cracks of the honeycomb structure after 100 cycles was confirmed, to evaluate the heat shock resistance. A case where any cracks were not generated was "A", and a case where the cracks were generated was "B". The presence/absence of the generation of the cracks was visually checked.

(Resistance Change)

A resistance change of the honeycomb structure was evaluated from resistance values of the honeycomb structure before and after the above "heat shock resistance" test. Specifically, the resistance value of the honeycomb structure before carrying out the above "heat shock resistance" test was measured. Then, the resistance value of the honeycomb structure after carrying out the "heat shock resistance" test was measured. When a difference between the resistance values before and after the "heat shock resistance" test was within 5% of the resistance value of the honeycomb structure before the "heat shock resistance" test, it was considered that "the resistance change" was "not present (no change)". When the difference between the resistance values before and after the "heat shock resistance" test was in excess of 5% of the resistance value of the honeycomb structure before the "heat shock resistance" test, it was considered that "the resistance change" was "present (the resistance value changed)". The measurement of the resistance value was carried out by connecting a wiring line to the electrode terminal projecting portion of the honeycomb structure to perform the energization. At the measurement, a voltage applying current measuring device was connected to the honeycomb structure, to apply the voltage thereto. A voltage of 100 to 200 V was applied, and a current value and a voltage value were measured. The electrical resistivity of the honeycomb structure was calculated from the obtained current value and voltage value. A resistance value which became minimum during the energization was the resistance value (the resistance) of the honeycomb structure. When large cracks were generated, the resistance value increased.

(Evaluation of Isostatic Strength)

The obtained honeycomb structure was immersed in water, and a hydrostatic pressure of 3.0 MPa was applied, to confirm generation of breakdown and cracks in the honeycomb structure. A case where any damages or cracks were not generated was "A". A case where the damages and cracks were generated was "B". The presence/absence of the generation of the cracks was checked by confirming a breakdown sound during the test and visually confirming an appearance of the honeycomb structure after the test.

TABLE 1

| | Young's modulus of partition walls (GPa) | Young's modulus of outer peripheral wall (low Young's modulus portion) (GPa) | Young's modulus of outer peripheral wall (high Young's modulus portion) (GPa) | Young's modulus ratio (%) | Porosity of outer peripheral wall (%) | Evaluation of heat shock resistance Presence/absence of cracks | Resistance value change | Evaluation of isostatic strength (hydrostatic pressure at 3.0 MPa) |
|---|---|---|---|---|---|---|---|---|
| Comparative Example 1 | 30 | 0.5 | 30.0 | 1.7 | 84 | A | No change | B |
| Example 1 | 30 | 0.8 | 30.0 | 2.7 | 82 | A | No change | A |
| Example 2 | 30 | 1.0 | 30.0 | 3.3 | 78 | A | No change | A |
| Example 3 | 30 | 1.5 | 30.0 | 5.0 | 73 | A | No change | A |
| Example 4 | 30 | 3.0 | 30.0 | 10.0 | 65 | A | No change | A |
| Example 5 | 30 | 9.0 | 30.0 | 30.0 | 53 | A | No change | A |
| Example 6 | 30 | 15.0 | 30.0 | 50.0 | 48 | A | No change | A |
| Example 7 | 30 | 18.0 | 30.0 | 60.0 | 45 | A | No change | A |
| Example 8 | 30 | 20.0 | 30.0 | 66.7 | 42 | B | No change | A |
| Example 9 | 30 | 28.5 | 30.0 | 95.0 | 37 | B | No change | A |
| Comparative Example 2 | 30 | 30.0 | 30.0 | 100.0 | 35 | B | Resistance value changed | A |

A: No cracks
B: Cracks generated

A: No damages
B: Damages and cracks present

Examples 2 to 9 and Comparative Examples 1 and 2

The procedures of Example 1 were repeated except that a Young's modulus of an outer peripheral wall was changed as shown in Table 1, to prepare each honeycomb structures.

Each of the obtained honeycomb structures of Examples 2 to 9 and Comparative Examples 1 and 2 was subjected to "evaluation of a heat shock resistance" and "evaluation of an isostatic strength" similarly to Example 1. The results are shown in Table 1.

Example 10

The procedures of Example 1 were repeated except chat a material to form a low Young's modulus portion of an outer peripheral wall was changed to a coating material, to manufacture a honeycomb structure. As the coating material in Example 10, a material made of inorganic fiber, colloidal silica, silicon carbide particles and the like was used.

In the honeycomb structure of Example 10, a Young's modulus of partition walls was 30 GPa, and a Young's modulus of the low Young's modulus portion was 0.6 GPa. The obtained honeycomb structure of Example 10 was subjected to "evaluation of a heat shock resistance" and "evaluation of an isostatic strength" similarly to Example 1. The results are shown in Table 2.

isostatic strength. Moreover, in the honeycomb structures of the present examples, the generation of large cracks to change the resistance value was not confirmed also in the evaluation of the heat shock resistance. That is, in the honeycomb structures of Examples 1 to 7 and 10 to 16, the generation of the cracks was not confirmed visually. Furthermore, also in Examples 8, 9 and 17, the generation of the cracks was partially confirmed, but any excessively large cracks to change the resistance value of each of the honeycomb structures were not generated. Therefore, each of the honeycomb structures of Examples 1 to 17 did not have any problems in use as a heater.

On the other hand, in Comparative Examples 1 and 3, the Young's modulus of the outer peripheral wall, specifically, the low Young's modulus portion was excessively low, and hence the isostatic strength deteriorated, and the generation of the damages and cracks was confirmed. Moreover, in Comparative Examples 2 and 4, the Young's modulus of the outer peripheral wall was excessively high, and hence the excessively large cracks to change the resistance value of each of the honeycomb structures were generated.

INDUSTRIAL APPLICABILITY

A honeycomb structure of the present invention can suitably be utilized as a catalyst carrier for an exhaust gas purifying device which purifies an exhaust gas of a car.

TABLE 2

| | Young's modulus of partition walls (GPa) | Young's modulus of outer peripheral wall (low Young's nodulus portion) (GPa) | Young's modulus of outer peripheral wall (high Young's modulus portion) (GPa) | Young's modulus ratio (%) | Porosity of outer peripheral wall (%) | Evaluation of heat shock resistance Presence/absence of cracks | Evaluation of heat shock resistance Resistance value change | Evaluation of isostatic strength (hydrostatic pressure at 3.0 MPa) |
|---|---|---|---|---|---|---|---|---|
| Comparative Example 3 | 30 | 0.3 | 30.0 | 1.0 | 70 | A | No change | B |
| Example 10 | 30 | 0.6 | 30.0 | 2.0 | 64 | A | No change | A |
| Example 11 | 30 | 1.0 | 30.0 | 3.3 | 60 | A | No change | A |
| Example 12 | 30 | 1.5 | 30.0 | 5.0 | 57 | A | No change | A |
| Example 13 | 30 | 3.0 | 30.0 | 10.0 | 50 | A | No change | A |
| Example 14 | 30 | 5.0 | 30.0 | 16.7 | 40 | A | No change | A |
| Example 15 | 30 | 10.0 | 30.0 | 33.3 | 36 | A | No change | A |
| Example 16 | 30 | 20.0 | 30.0 | 66.7 | 25 | A | No change | A |
| Example 17 | 30 | 28.5 | 30.0 | 95.0 | 22 | B | No change | A |
| Comparative Example 4 | 30 | 30.0 | 30.0 | 100.0 | 20 | B | Resistance value changed | A |
| | | | | | | A: No cracks B: Cracks generated | | A: No damages B: Damages and cracks present |

Examples 11 to 17 and Comparative Examples 3 and 4

The procedures of Example 1 were repeated except that Young's moduli of an outer peripheral wall and each electrode portion were changed as shown in Table 2, to prepare each of honeycomb structures. Each of the obtained honeycomb structures of Example 11 to 17 and Comparative Examples 3 and 4 was subjected to "evaluation of a heat shock resistance" and "evaluation of an isostatic strength" similarly to Example 1. The results are shown in Table 2.

As seen from Table 1 and Table 2, in the honeycomb structures of the present examples, the generation of damages and cracks was not confirmed in the evaluation of the

DESCRIPTION OF REFERENCE NUMERALS

1: partition wall, 2: cell, 3: outer peripheral wall, 4: honeycomb structure portion, 5: side surface, 6: low Young's modulus portion, 6a: first low Young's modulus portion, 6b: second low Young's modulus portion, 6c: low Young's modulus portion (the low Young's modulus portion having a low Young's modulus and having electric insulating properties), 7: high Young's modulus portion, 11: one end surface, 12: the other end surface, 21, 21a and 21b: electrode portion, 21x: one end of the electrode portion, 21y: the other end of the electrode portion, 22: electrode terminal projecting portion, 22a: base, 22b: projection, 23: conductor, 100, 100A, 200, 300, 400, 500, 600, 7002, 700B, 800 and 900: honeycomb structure, O: center, E and G: length of corner portion in cell direction, F and H: length of the corner portion in vertical direction, I: cell extending direction, L: axis, P: line segment connecting center point of one electrode portion to the center of honeycomb structure portion, Q: line segment connecting center point of the other electrode portion to the center of honeycomb structure portion, α: center angle, θ: angle of 0.5 time the center angle, β: angle formed between line segment (P) and line segment (Q), and γ: center angle of low Young's modulus portion.

The invention claimed is:

1. A honeycomb structure comprising a tubular honeycomb structure portion including: porous partition walls with which a plurality of cells extending from one end surface to the other end surface are formed to partition through channels of a fluid, an outer peripheral wall positioned only on an outermost periphery of the porous partition walls, and a pair of electrode portions arranged in a band-like state in a cell extending direction of the honeycomb structure portion on a side surface of the honeycomb structure portion, wherein an electrical resistivity of the partition walls is from 1 to 200 Ωcm, wherein at least a part of the outer peripheral wall is formed by a low Young's modulus portion configured to have a Young's modulus lower than the Young's modulus of the partition walls, wherein a ratio of the Young's modulus of the low Young's modulus portion to the Young's modulus of the partition walls is from 2 to 95%, and wherein a Young's modulus of the electrode portions is from 0.8 to 30 GPa.

2. The honeycomb structure according to claim 1,
wherein all of the outer peripheral wall is formed by the low Young's modulus portion.

3. The honeycomb structure according to claim 2,
wherein the ratio of the Young's modulus of the low Young's modulus portion to the Young's modulus of the partition walls is from 2 to 60%.

4. The honeycomb structure according to claim 1,
wherein a Young's modulus of the electrode portions is lower than the Young's modulus of the partition walls.

5. The honeycomb structure according to claim 2,
wherein two band-like regions of the outer peripheral wall which are arranged in the cell extending direction of the honeycomb structure portion form a pair of electrode portions having a lower electrical resistivity than the other region of the outer peripheral wall.

6. The honeycomb structure according to claim 1,
wherein a porosity of the electrode portions is from 30 to 80%.

7. The honeycomb structure according to claim 1,
wherein an electrical resistivity of the electrode portions is from 0.1 to 100 Ωcm.

8. The honeycomb structure according to claim 1,
wherein a part of the outer peripheral wall is formed by the low Young's modulus portion, and a part other than the low Young's modulus portion in the outer peripheral wall is formed by a high Young's modulus portion configured to have the same Young's modulus as that of the partition walls or a Young's modulus higher than that of the partition walls.

9. The honeycomb structure according to claim 8,
wherein a ratio of the Young's modulus of the low Young's modulus portion to the Young's modulus of the partition walls is from 2 to 60%.

10. The honeycomb structure according to claim 8,
wherein the pair of electrode portions is disposed on at least the surface of the high Young's modulus portion.

11. The honeycomb structure according to claim 4,
wherein a part of the outer peripheral wall has an electrical resistivity larger than that of the electrode portions.

12. The honeycomb structure according to claim 1,
wherein the Young's modulus of the partition walls is from 20 to 45 GPa.

13. The honeycomb structure according to claim 1,
wherein the low Young's modulus portion is made of the same material as that of the partition walls.

14. The honeycomb structure according to claim 1,
wherein the low Young's modulus portion is made of a material different from that of the partition walls.

* * * * *